United States Patent
Steinberger et al.

(10) Patent No.: US 11,784,468 B2
(45) Date of Patent: Oct. 10, 2023

(54) BUSBAR BOARD

(71) Applicant: Wöhner Besitz GmbH, Rödental (DE)

(72) Inventors: Philipp Steinberger, Coburg (DE); Joram Masel, Küps (DE); Florian Höfner, Rödental (DE)

(73) Assignee: Wöhner Besitz GmbH, Rödental (DE)

( * ) Notice: Subject to any disclaimer, the term of this patent is extended or adjusted under 35 U.S.C. 154(b) by 0 days.

(21) Appl. No.: 17/632,996

(22) PCT Filed: Jun. 18, 2021

(86) PCT No.: PCT/EP2021/066684
§ 371 (c)(1),
(2) Date: Feb. 4, 2022

(87) PCT Pub. No.: WO2021/255273
PCT Pub. Date: Dec. 23, 2021

(65) Prior Publication Data
US 2022/0320835 A1    Oct. 6, 2022

(30) Foreign Application Priority Data

Jun. 19, 2020 (EP) .................................. 20181090

(51) Int. Cl.
*H02B 1/20* (2006.01)
*H01R 25/14* (2006.01)
(Continued)

(52) U.S. Cl.
CPC ............... *H02B 1/20* (2013.01); *H01R 9/28* (2013.01); *H01R 25/14* (2013.01); *H01R 25/145* (2013.01); *H02B 1/14* (2013.01); *H02B 1/32* (2013.01)

(58) Field of Classification Search
CPC . H02B 1/056; H02B 1/14; H02B 1/20; H02B 1/32–34; H01R 9/28
See application file for complete search history.

(56) References Cited

U.S. PATENT DOCUMENTS 7,273,377 B2 * 9/2007 Seymour ............ H01R 13/6273
434/118
8,625,257 B2 * 1/2014 Schalk .................... H02B 1/056
361/652
(Continued)

FOREIGN PATENT DOCUMENTS

DE   102019009196 A1 *  3/2021   ............... H02B 1/06
DE   202020101244 U1 *  7/2021   ........... H01R 9/2675
(Continued)

OTHER PUBLICATIONS

International Search Report corresponding to PCT Application No. PCT/EP2021/066684, dated Sep. 9, 2021 (3 pages).

*Primary Examiner* — Robert J Hoffberg
(74) *Attorney, Agent, or Firm* — Maginot, Moore & Beck, LLP

(57) ABSTRACT

A busbar board (1) for connection of devices (11) to a power busbar system, wherein the busbar board (1) comprises a front side touch protection cover plate (2) having feed-through openings (7) for electrical connection contacts (13) of devices (11) to be connected to the busbar board (1), wherein the touch protection cover plate (2) is adapted to cover power busbars (6) having contact openings (5) lying directly beneath the feed-through openings (7) of the touch protection cover plate (2) and comprising a touch protection base plate (3) connected to said touch protection cover plate (2), wherein the touch protection base plate (3) covers the power busbars (6) enclosed by the busbar board (1) from behind, wherein a power feed-in of electrical power into the power busbars (6) enclosed by the busbar board (1) is provided by power feed-in plugs (10) being pluggable into socket (26) of the touch protection base plate (3) of the busbar board (1).

22 Claims, 28 Drawing Sheets

(51) Int. Cl.
*H02B 1/32* (2006.01)
*H02B 1/14* (2006.01)
*H01R 9/28* (2006.01)

(56) References Cited

U.S. PATENT DOCUMENTS

| | | | |
|---|---|---|---|
| 9,515,397 B2* | 12/2016 | Buettner | H02G 5/04 |
| 9,704,417 B2* | 7/2017 | Neal | G09B 23/183 |
| 10,374,396 B2* | 8/2019 | Schell | H02B 1/042 |
| 10,700,464 B2* | 6/2020 | Steinberger | H02B 1/052 |
| 10,879,642 B2* | 12/2020 | Steinberger | H02B 1/0523 |
| 11,139,622 B2* | 10/2021 | Steinberger | H02G 5/06 |
| 11,139,747 B2* | 10/2021 | Steinberger | H02M 7/003 |
| 2012/0028492 A1* | 2/2012 | Del Aguila Aguilar | H01R 9/28 |
| | | | 439/391 |
| 2021/0159650 A1* | 5/2021 | Masel | H01R 33/94 |
| 2021/0399509 A1* | 12/2021 | Masel | H01R 13/447 |
| 2022/0158421 A1* | 5/2022 | Kayma | H02B 1/21 |

FOREIGN PATENT DOCUMENTS

| | | | | |
|---|---|---|---|---|
| EP | 2 164 136 A2 | | 3/2010 | |
| EP | 3823113 A1 | * | 5/2021 | H02B 1/14 |
| WO | 2019/174886 A1 | | 9/2019 | |

\* cited by examiner

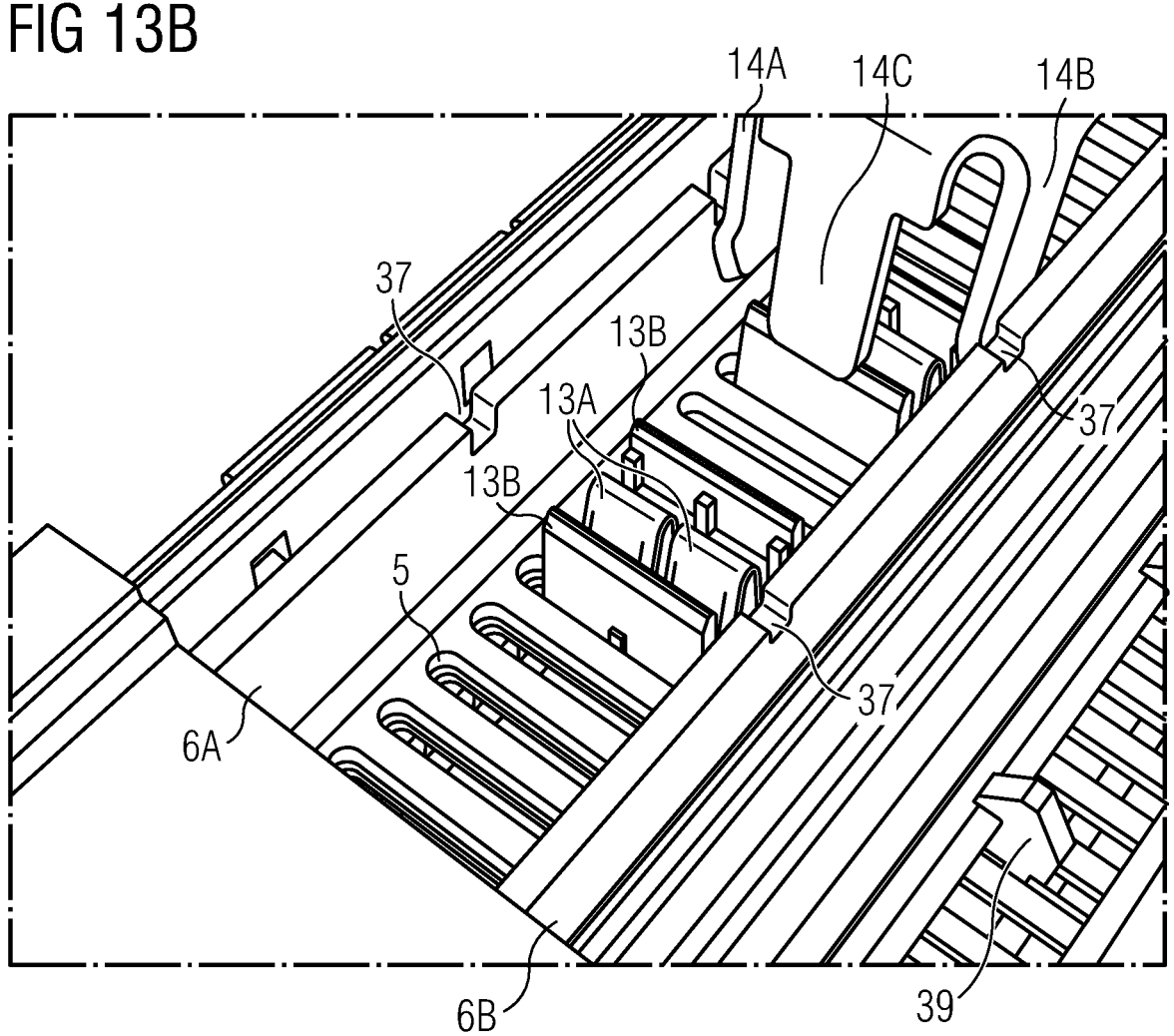

BUSBAR BOARD

PRIORITY CLAIM

This application is a 35 U.S.C. § 371 National Stage Application of PCT/EP/2021/066684, filed on Jun. 18, 2021, which claims the benefit of priority to Serial No. EP 20181090.0, filed on Jun. 19, 2020, in Europe, the disclosures of which are incorporated herein by reference in their entirety.

The invention relates to a busbar board with a rear side power feed-in.

Power busbars are provided to supply devices with electrical power. Conventional busbar systems use busbars with a rectangular cross section for power transmission. These power busbars can for instance be mounted inside of control cabinets. Busbars can be used for single-phase or multi-phase power supply systems. The power busbars of the power busbar system receive the electrical power from an external power supply system. In a conventional power busbar system, it is necessary to provide electrical insulation to protect the user. Conventional power-transmitting busbars can be covered by means of protective covers where no devices are mounted on the busbars. Accordingly, with conventional busbar systems, there is a considerable installation effort for a user because not only electrical devices must be mounted on the busbars but also additional electrical insulating cover elements are electrically attached to the busbars to protect the user.

Accordingly, it is an object of the present invention to provide a power supply to a power busbar system without occupying available space for the connection of electrical devices to the power busbar system while offering a user a high level of operational safety when connecting electrical devices to the power busbar system.

The invention provides according to the first aspect a busbar board for connection of devices to a power busbar system, wherein the busbar board comprises a front side touch protection cover plate having feedthrough openings for electrical connection contacts of devices to be connected to the busbar board, wherein the touch protection cover plate is adapted to cover power busbars having contact openings lying directly beneath the feed-through openings of the touch protection cover plate and comprising a touch protection base plate connected to said touch protection cover plate,
wherein the touch protection base plate covers the power busbars enclosed by the busbar board from behind, wherein a power feed-in of power into the power busbars enclosed by the busbar board is provided by power feed-in plugs being pluggable into sockets of the touch protection base plate of the busbar board.

An advantage of the busbar board according to the first aspect of the present invention is provided by the power feed-in of the electrical power from the rear side such that the front side of the busbar board can be covered completely by connected electrical devices without wasting any of the available space at the front side of the busbar board.

The power feed-in of electrical power from the rear side provides additional protection to a user installing electrical devices to the power busbar system from the front side.

Further, since the power feed-in plugs are pluggable into corresponding sockets within the touch protection base plate at the rear side of the busbar board, the connection of the busbar board to an external power supply system can be performed quite easily and fast.

In a possible embodiment of the busbar board according to the first aspect of the present invention, the busbar board can be attached to a mounting plate.

The busbar board according to the first aspect of the present invention can also be attached to a mounting frame.

Both the mounting plate and the mounting frame can be provided within a control cabinet.

In a possible embodiment of the busbar board according to the first aspect of the present invention, the busbar board comprises several elongated electrically conductive power busbars which are arranged in parallel and which are connectable by means of associated feed-in plugs from behind to provide a rear side power feed-in.

The conductive power busbars are encapsulated by the busbar board to provide protection to the user.

In a further possible embodiment of the busbar board according to the first aspect of the present invention, the power busbars arranged within the busbar board comprise each a U-shaped cross profile with sidewalls facing each other and the sidewalls being connected with each other by means of a connecting bridge, which comprises contact openings for insertion of resilient electrical connection contacts of devices to be connected to the busbar board from the front side.

The power busbars may have different shapes. The power busbars can for instance also have an L-shape. A lyra-shaped contact tongue can embrace one side of the L-shaped power busbar to provide power supply from the rear.

Accordingly, the power busbars encapsulated by the busbar board according to the first aspect of the present invention are not conventional power busbars with a rectangular cross section but have a specific shape allowing the reception of resilient electrical connection contacts of devices inserted through feed-through openings of the front side touch protection cover plate and into contact openings of the covered power busbars to establish an electrical connection.

In a further possible embodiment of the busbar board according to the first aspect of the present invention, the power feed-in plugs comprise contact tongues facing each other.

The contact tongues of the power feed-in plugs can abut one or both sidewalls of the corresponding power busbar from the inside and/or outside.

In an alternative implementation, the contact tongues of the power feed-in plugs can be lyra-shaped to embrace one or both sidewalls of a corresponding power busbar to provide an electrical contact.

In a further possible embodiment of the busbar board according to the first aspect of the present invention, the power feed-in plugs which are provided for the feed-in of electrical power into the different power busbars enclosed by the busbar board are fixed at the rear side to feed-in lamellae or to feed-in circular conductors by means of an associated clamp connection or screw connection which can be covered by a cover hood.

In a further possible embodiment of the busbar board according to the first aspect of the present invention, the power feed-in plugs which are provided for feed-in of electrical power into the different power busbars enclosed by the busbar board are connected at the rear side to feed-in power busbars which are directed crosswise to the power busbars enclosed by the busbar board.

In a further possible embodiment of the busbar board according to the first aspect of the present invention, the power feed-in plugs provided for the feed-in of electrical power into the different power busbars enclosed by the busbar board comprise each at the rear side lyra-shaped resilient flexible contact tongues wherein the contact tongues face each other and abut the associated feed-in power busbars to establish an electrical contact.

In a further possible embodiment of the busbar board according to the first aspect of the present invention, the feed-in power busbars are attached by means of at least one busbar support element to a strut of a mounting frame or to a mounting plate to provide a mechanical support connection.

In a possible embodiment, the feed-in power busbars can be covered by isolating cover elements and/or can comprise an electrical isolation of another kind.

In a further possible embodiment of the busbar board according to the first aspect of the present invention, the touch-protected feed-in power busbars are oriented in a vertical direction and are attached by means of at least one busbar support element to a parallel vertical strut of the mounting frame or are attached to a mounting plate for providing mechanical support connection.

In a further possible embodiment of the busbar board according to the first aspect of the present invention, the busbar support element is adapted to receive feed-in power busbars with different cross sections and comprises corresponding mechanical adjustment elements.

In a further possible embodiment of the busbar board according to the first aspect of the present invention, the mounting frame comprises at least two parallel struts which are connected to each other by means of one or more cross-struts.

In a further possible embodiment of the busbar board according to the first aspect of the present invention, the busbar board can be attached mechanically to counter-contours of the mounting frame or to counter-contours of the mounting plate by means of bracket elements, angled elements, adapter elements and/or latching elements.

In a still further possible embodiment of the busbar board according to the first aspect of the present invention, the power feed-in plugs which are provided for the feed-in of electrical power into the different power busbars enclosed by the busbar board are integrated in a multipole feed-in plug module.

In a further possible embodiment of the busbar board according to the first aspect of the present invention, the front side touch protection cover plate of the busbar board can be covered completely with devices having electrical connection contacts passing through the feedthrough openings of the touch protection cover plate into underlying contact openings of a contact opening grid of the power busbars enclosed by the busbar board to establish an electrical connection.

In a further possible embodiment of the busbar board according to the first aspect of the present invention, the busbar board consists of several assembled busbar board segments wherein each busbar board segment comprises a touch protection cover plate segment and a touch protection base plate segment which are connected to each other mechanically.

In a further possible embodiment of the busbar board according to the first aspect of the present invention, the rear side power feed-in for the power busbars by means of the feed-in plugs is performed by means of load break switches and/or current protection elements located at the rear side of the busbar board and which can be operated from the front side or can be controlled by means of a control device connected to the front side of said busbar board.

In a further possible embodiment of the busbar board according to the first aspect of the present invention, the current protection elements comprise controllable electronic current protection elements and/or current protection fuses.

In a further possible embodiment of the busbar board according to the first aspect of the present invention, the touch-protected busbar board comprises besides the power busbars electrical data lines for providing communication between the devices connected to the power busbars.

In a further possible embodiment of the busbar board according to the first aspect of the present invention, the devices connected to the power busbar system can communicate directly with each other by means of powerline communication via the power busbars enclosed by the touch-protected busbar board.

In a further possible alternative embodiment of the busbar board according to the first aspect of the present invention, the devices connected to the busbar system can communicate with each other via wireless radio interfaces.

In a further possible embodiment of the busbar board according to the first aspect of the present invention, the feed-in plugs, the feed-in plug module and/or the touch-protected busbar board can comprise measuring modules provided for performing a current and/or voltage measurement to generate measurement values or sensor data output by means of data interfaces.

In a still further possible embodiment of the busbar board according to the first aspect of the present invention, the touch-protected busbar board comprises in addition to the power busbars electrical supply lines or supply busbars for supplying measuring modules or transceivers provided within the touch-protected busbar board and/or devices connected to the touch-protected busbar board with auxiliary supply voltages which are received at the rear side by means of the feed-in plugs or generated by transforming the feed-in power.

In a further possible embodiment of the busbar board according to the first aspect of the present invention, the touch-protected busbar board comprises mechanical connection elements used for connecting the busbar board with other busbar boards.

In a still further possible embodiment of the busbar board according to the first aspect of the present invention, the busbar board is connectable without using a mechanical tool to corresponding counter-contours of a mounting plate or of a mounting frame.

In a further possible embodiment of the busbar board according to the first aspect of the present invention, the feed-in plugs plugged into the busbar board are mechanically lockable.

In a still further possible embodiment of the busbar board according to the first aspect of the present invention, the busbar board comprises an elongated shape, wherein wiring comb elements or other system extension elements are attachable to one or both long sides of the elongated busbar board.

The extension elements may comprise additional components or devices including e.g. additional power busbar modules, in particular for PE/N busbars, busbar modules for auxiliary low voltages, modules for data bus interfaces, hut rail profile adapter modules for mounting different kinds of hut rail devices such as clamping elements or also electrical devices such as fan or cooling devices.

The invention provides according to a second aspect a control cabinet with a control cabinet housing which comprises at least one mounting plate and/or at least one mounting frame used for mounting at least one or more busbar boards according to the first aspect of the present invention.

In the following, possible embodiments of the different aspects of the present invention are described in more detail with reference to the enclosed figures.

Figure 13A:
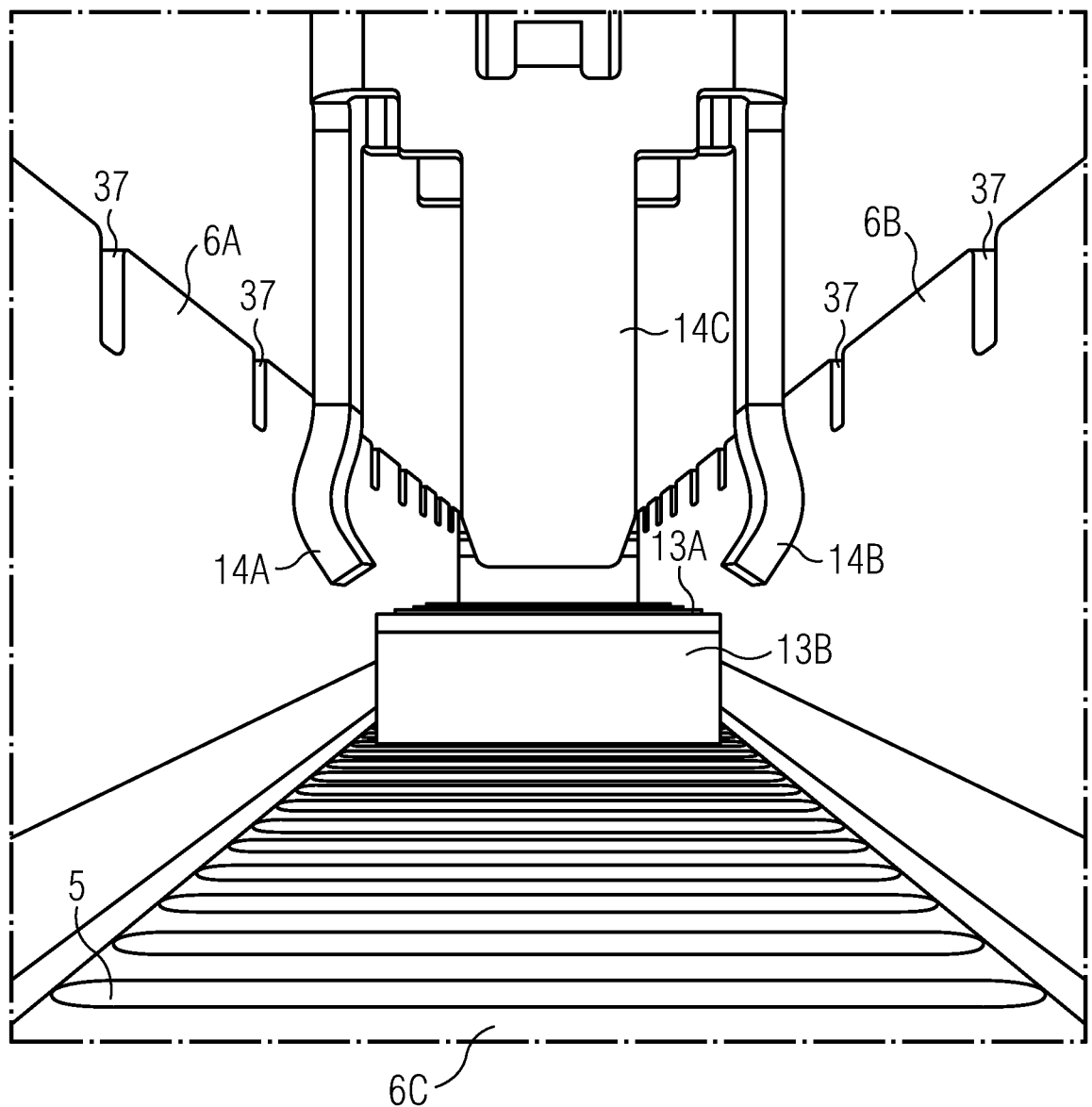
Figure 14:
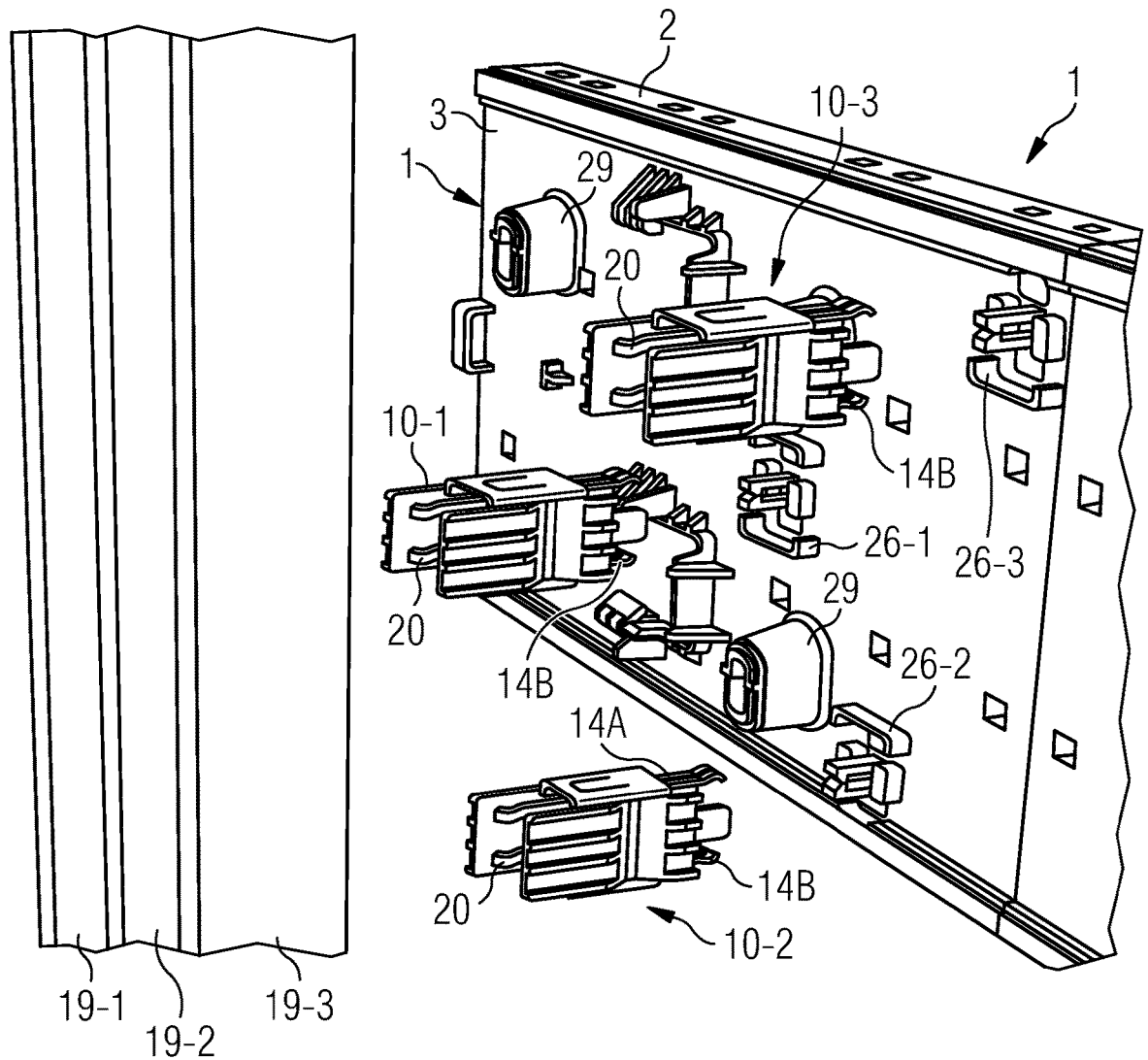
Figure 15:
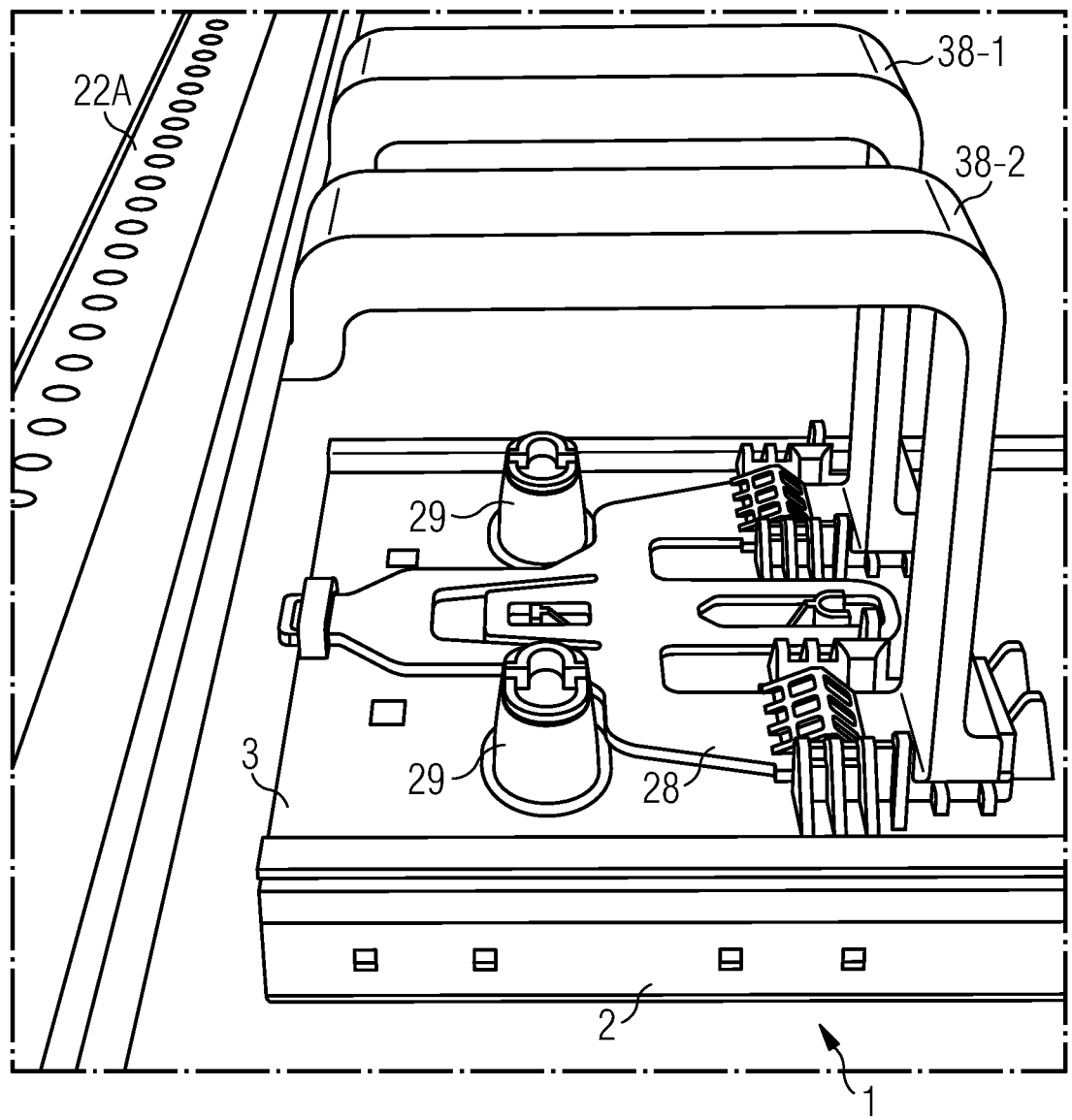
Figure 16:
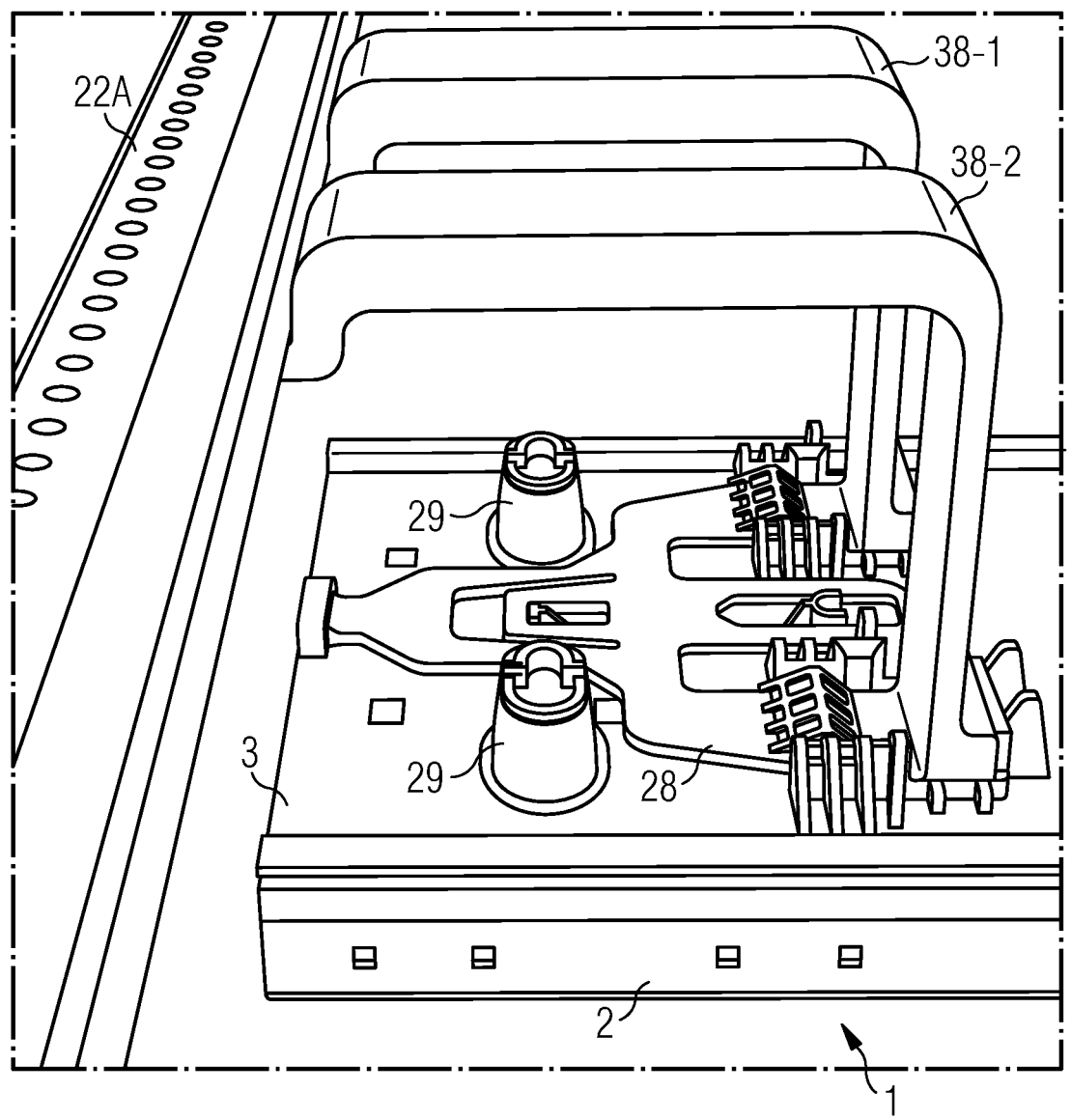
Figure 17:
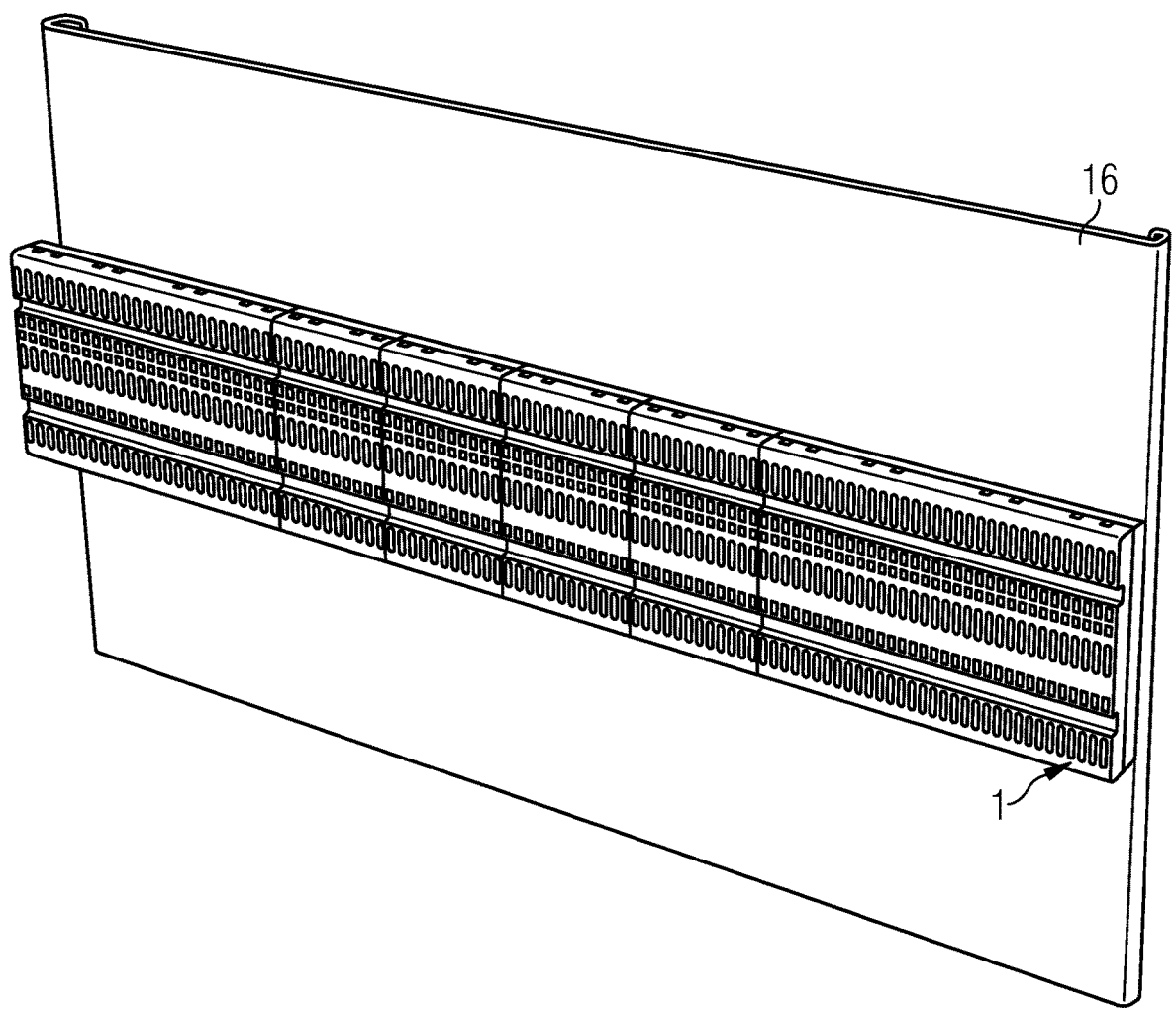
Figure 18:
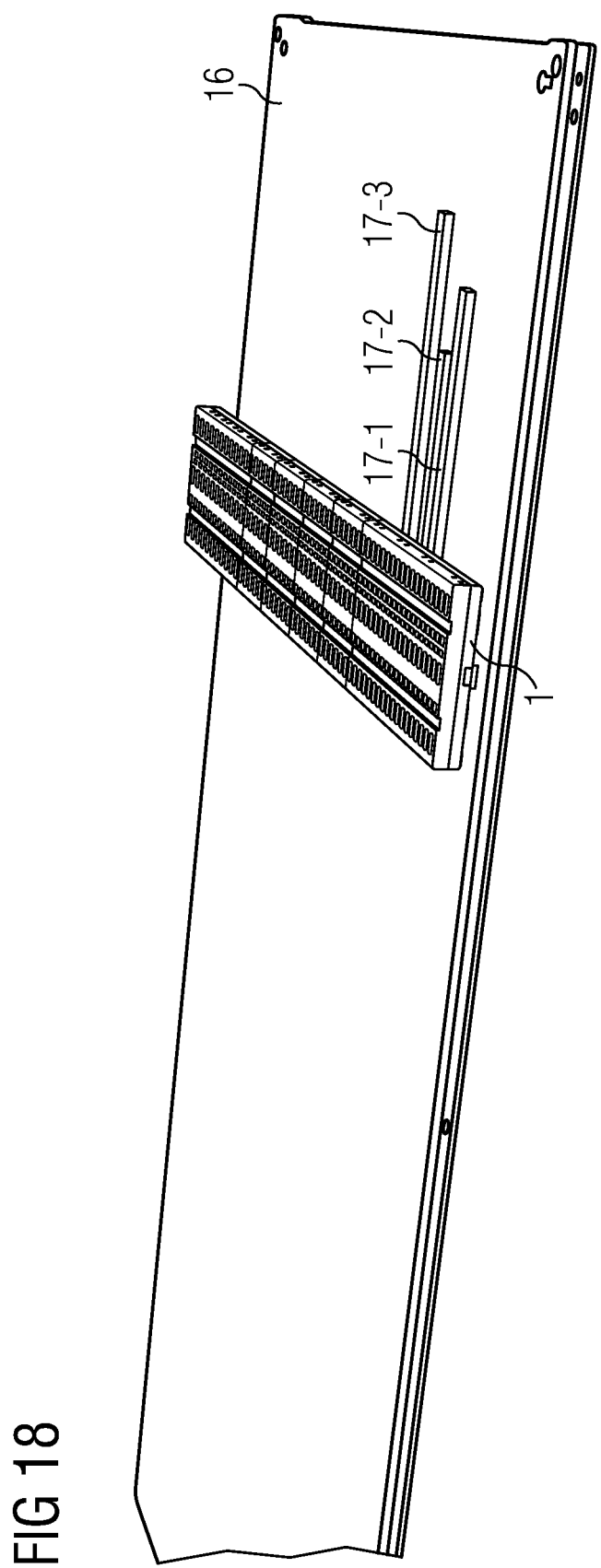
Figure 19:
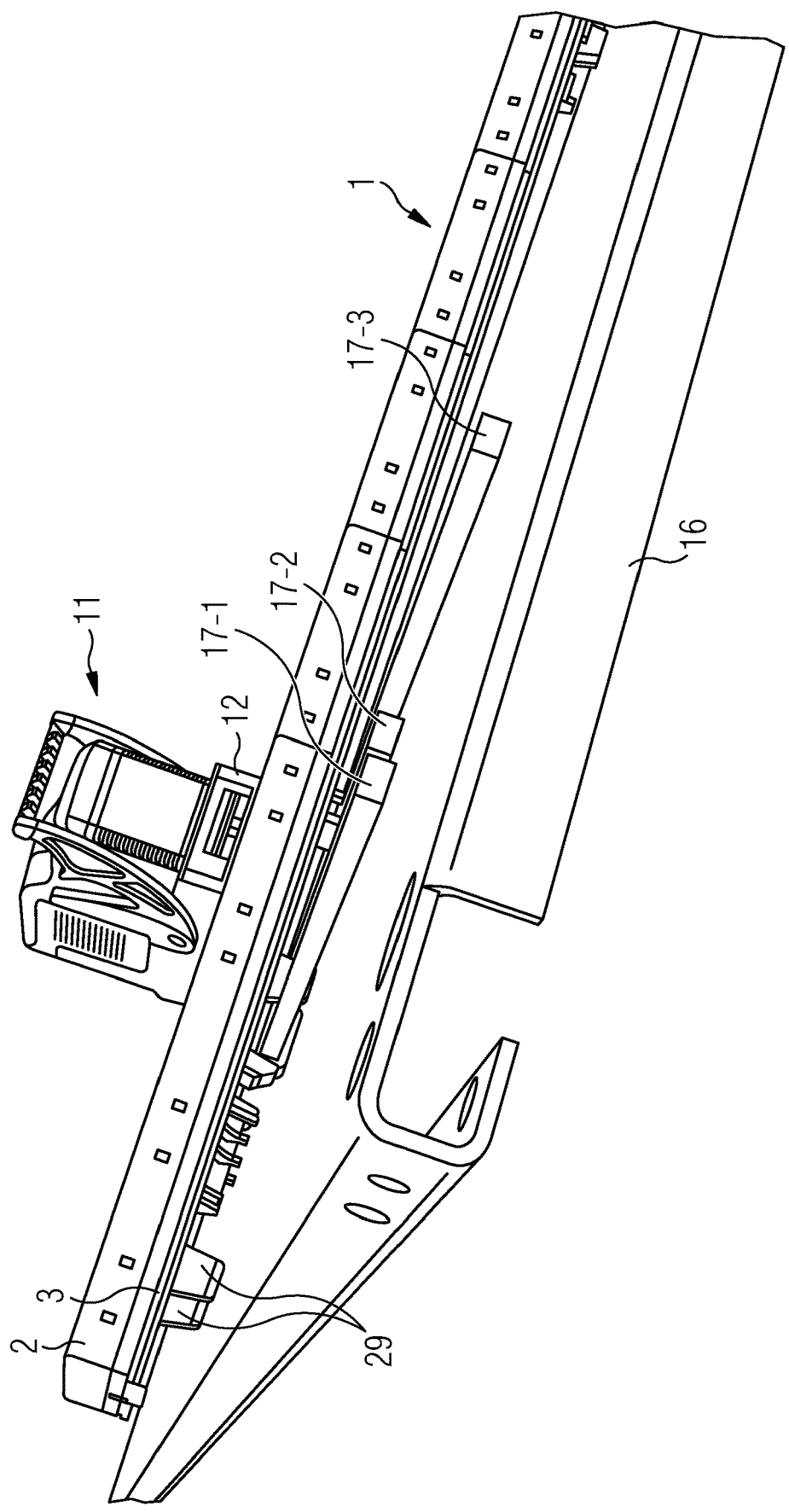
Figure 20:
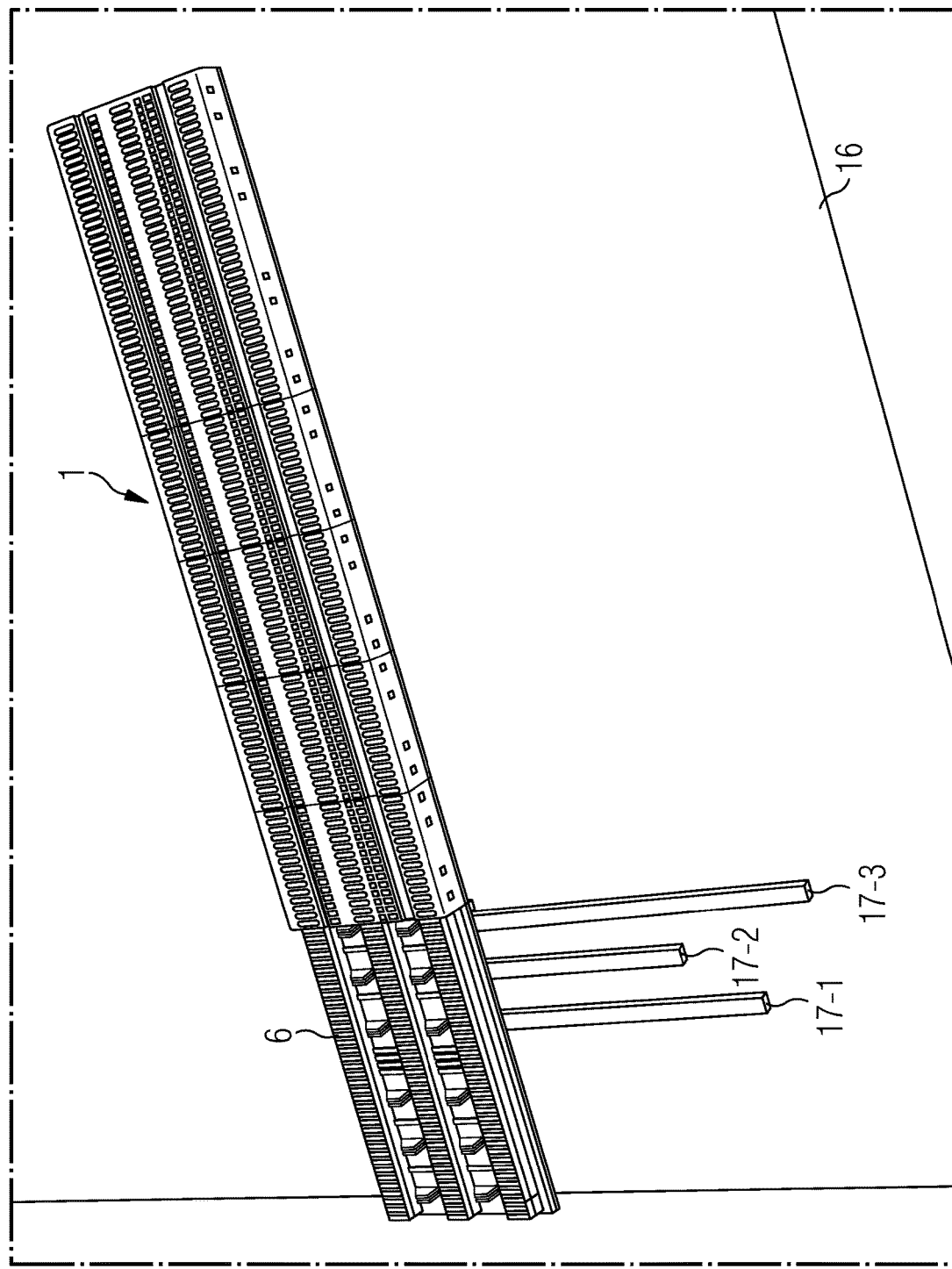
Figure 21:
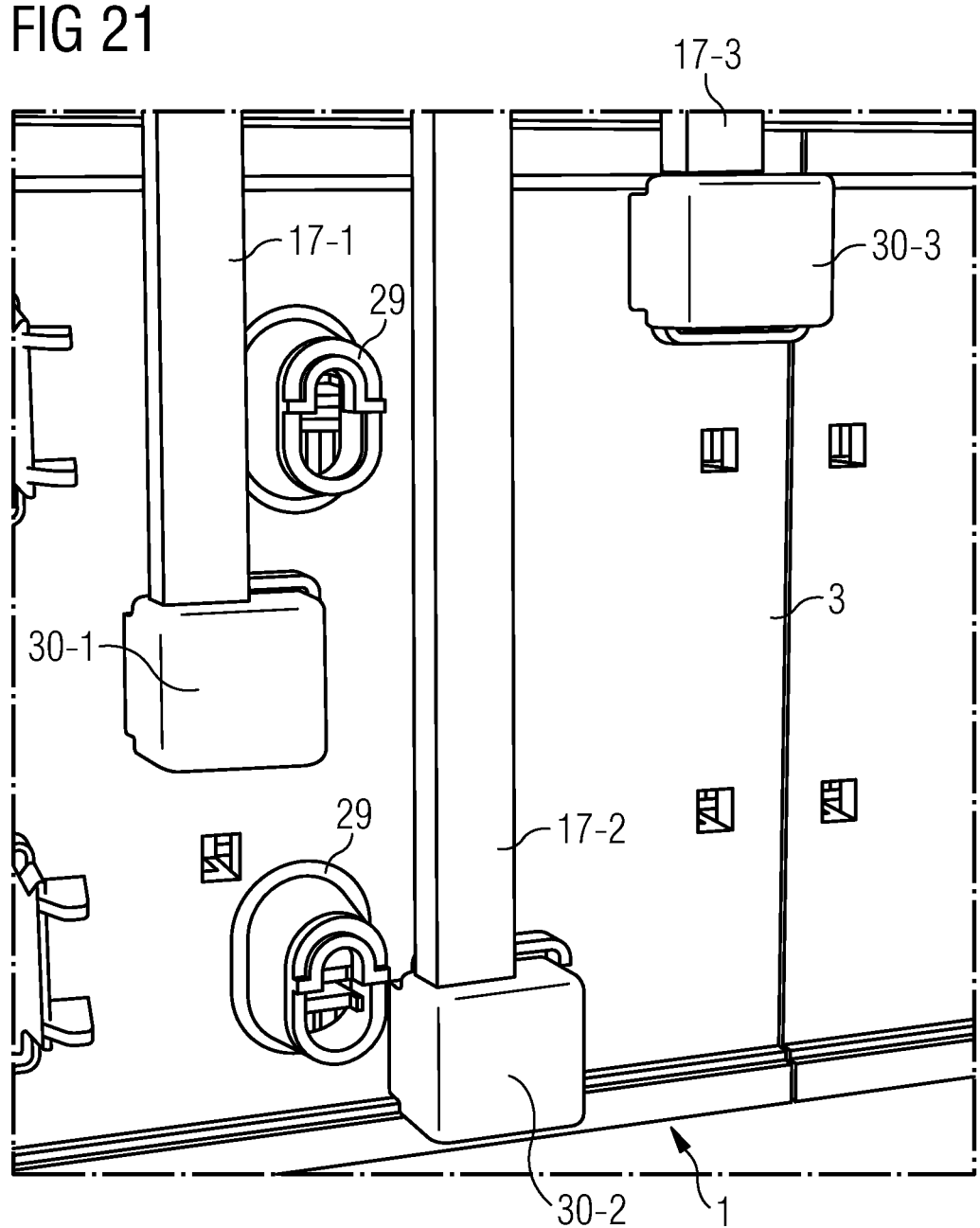
Figure 22:
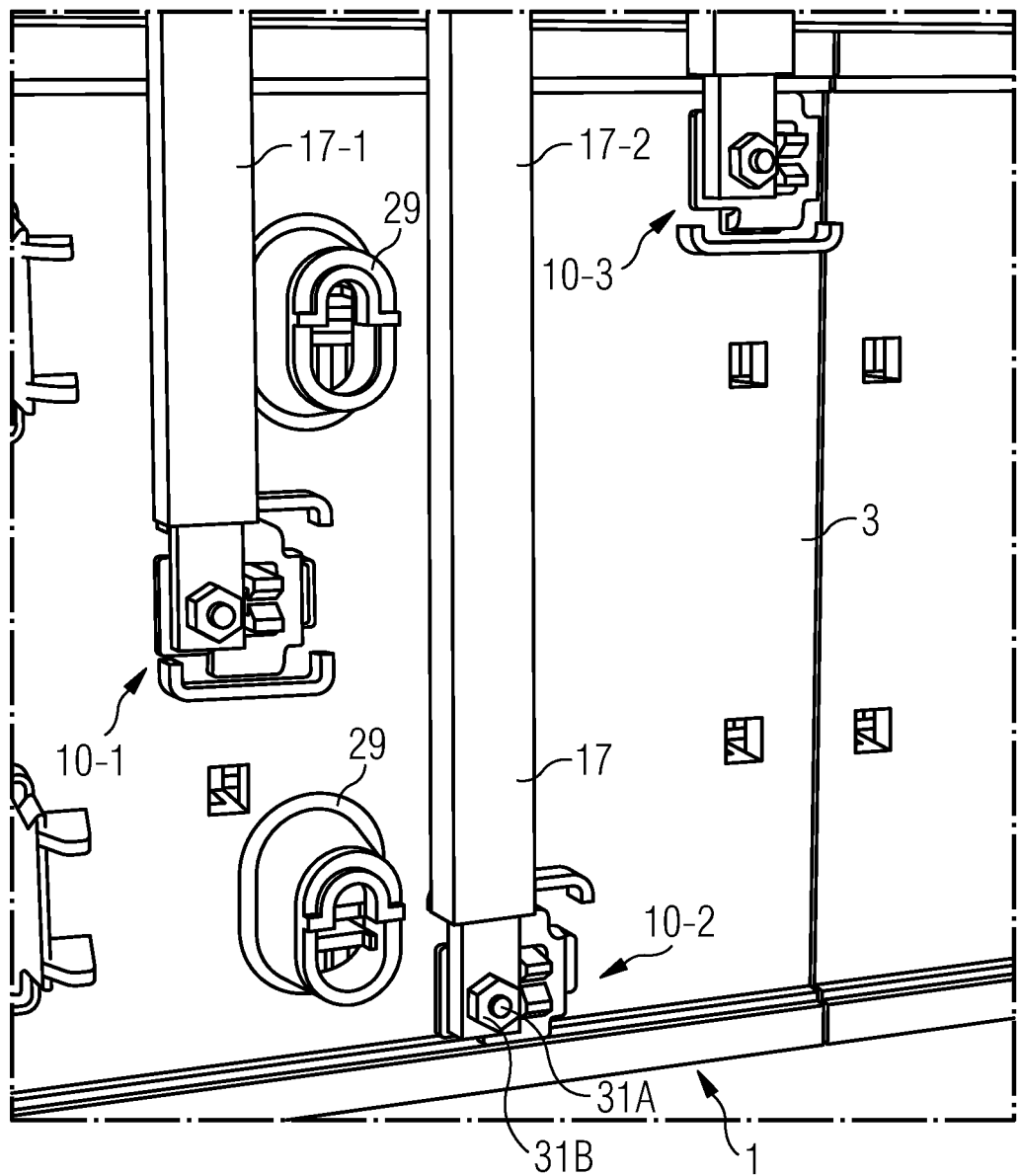
Figure 23:
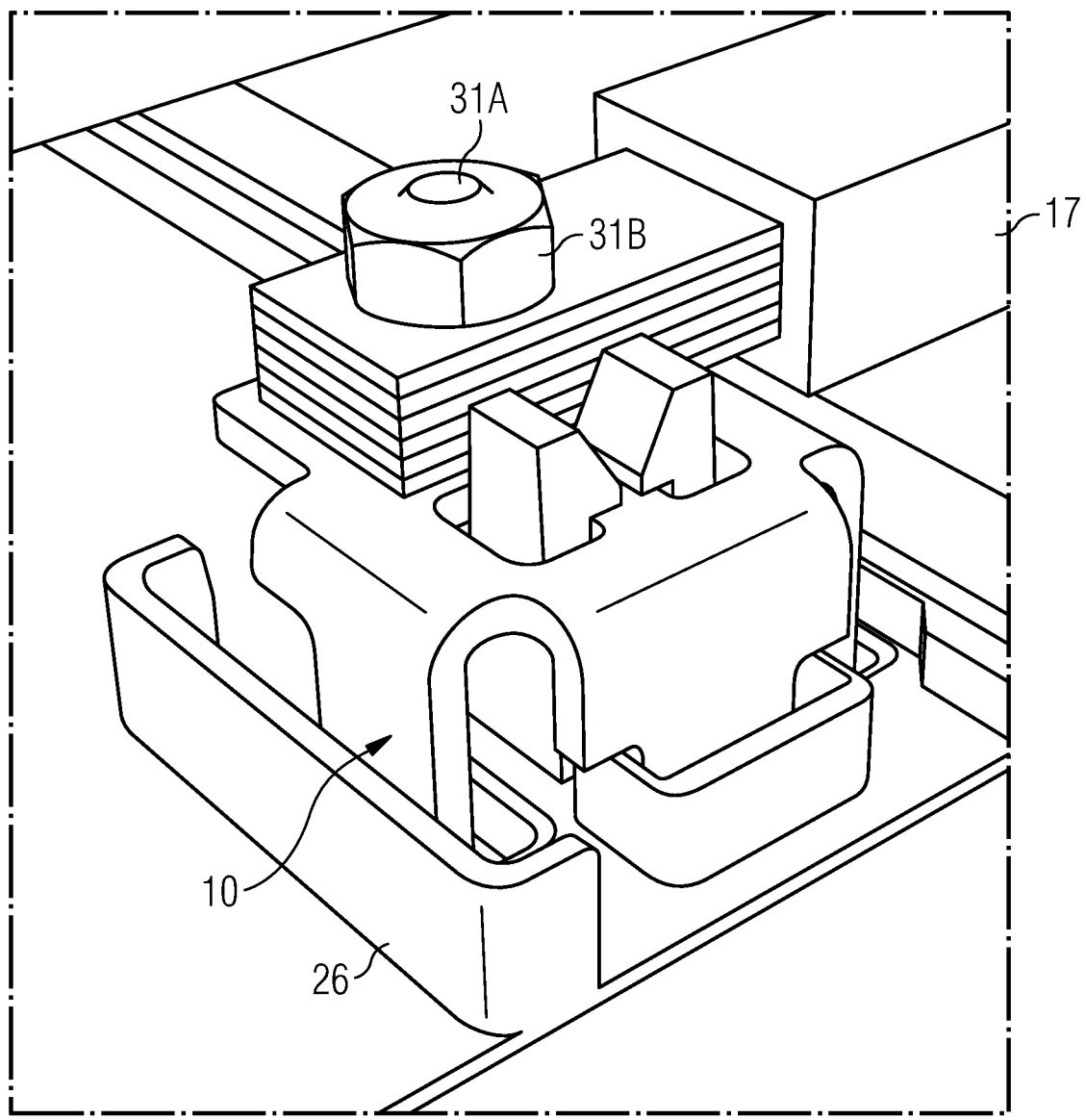
Figure 24:
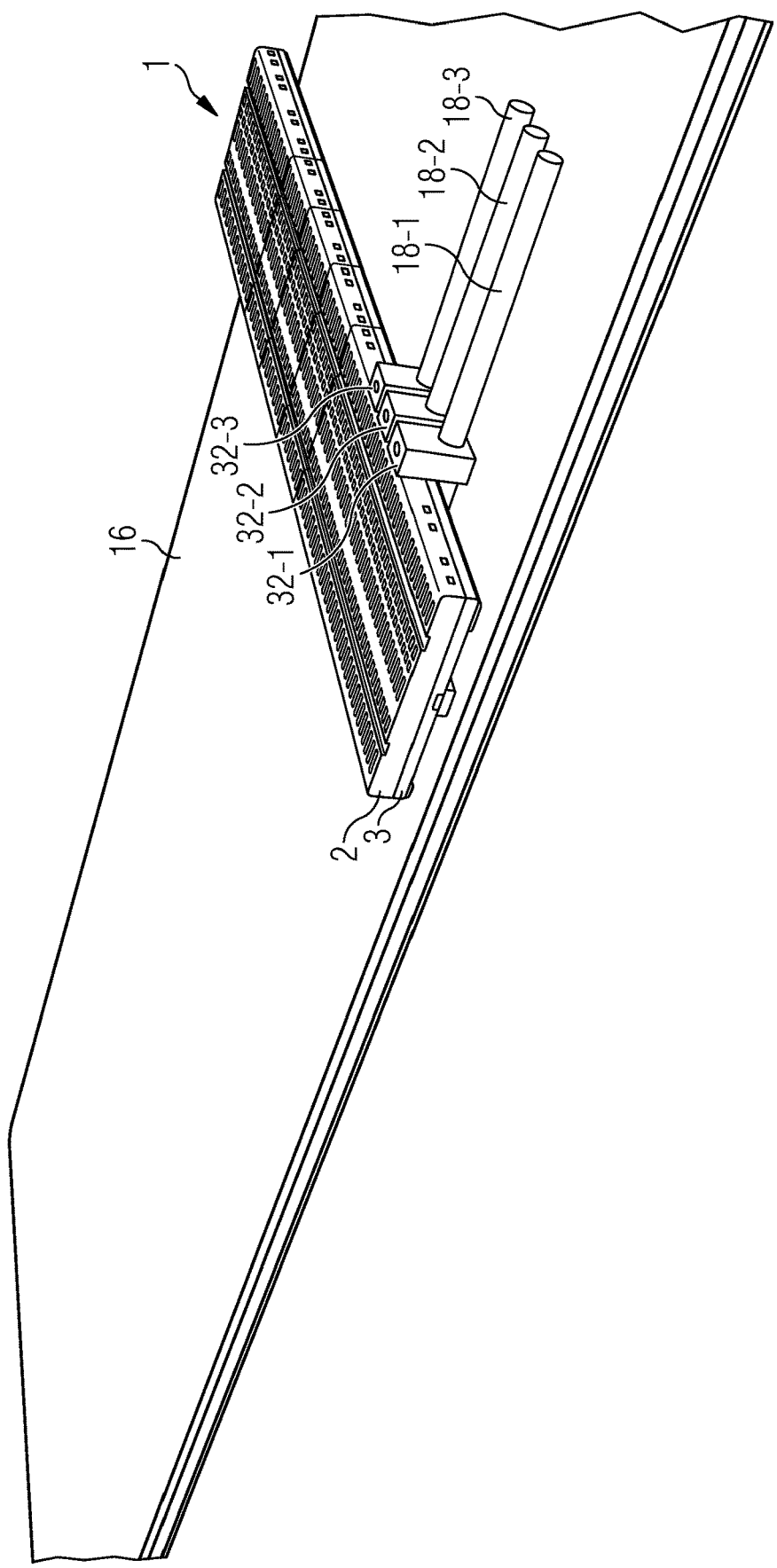
Figure 25:
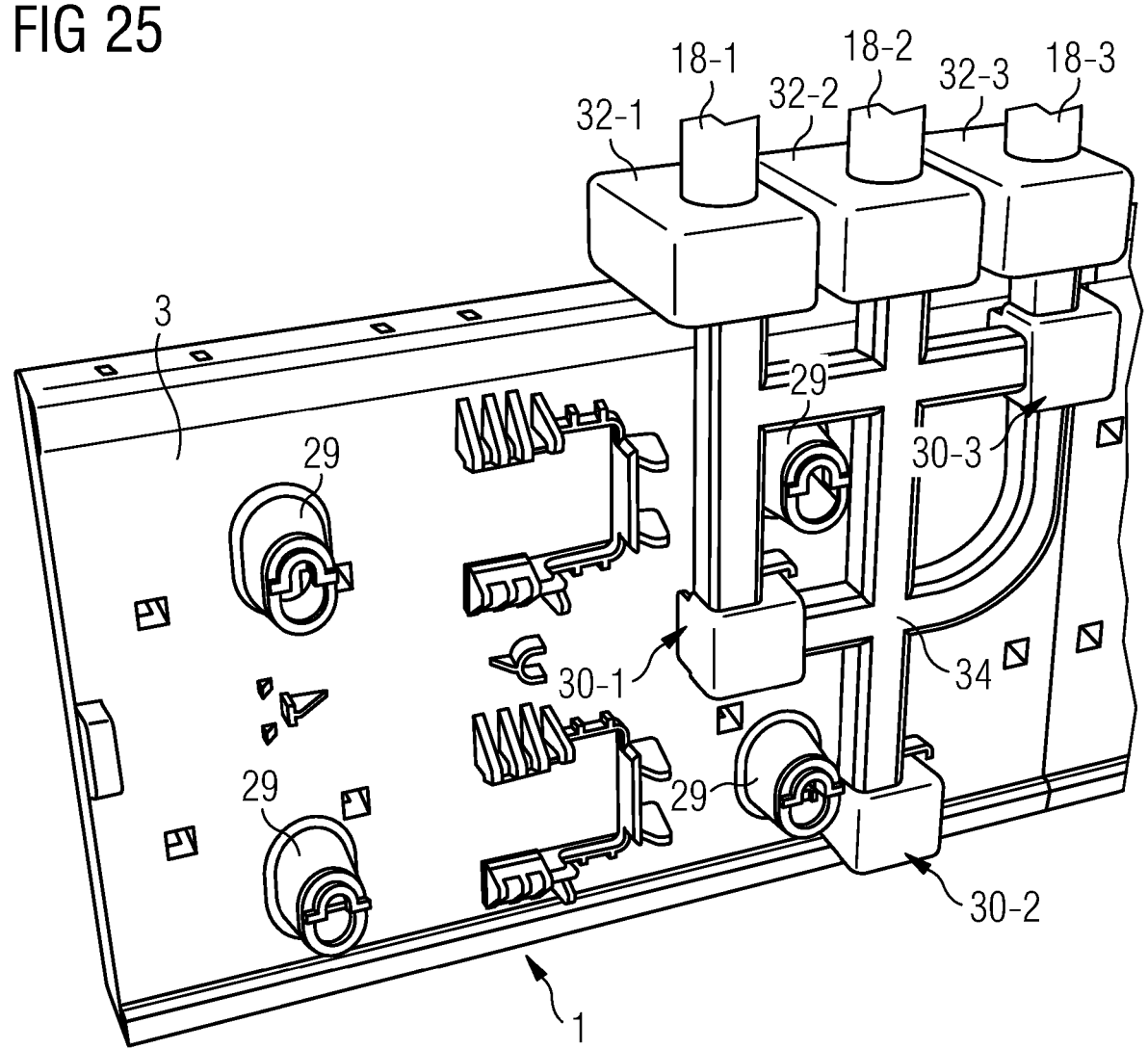
Figure 26:
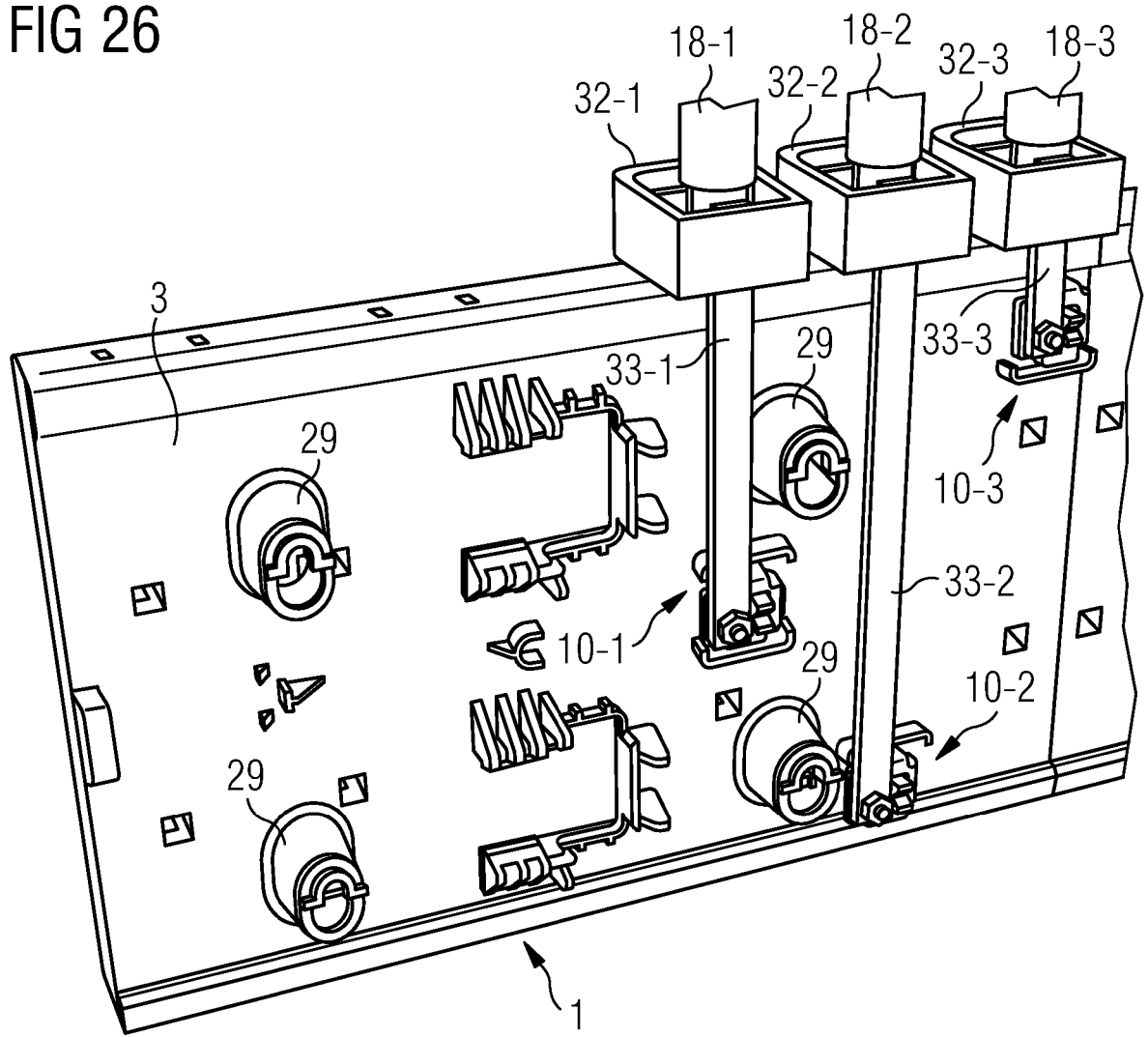
Figure 27:
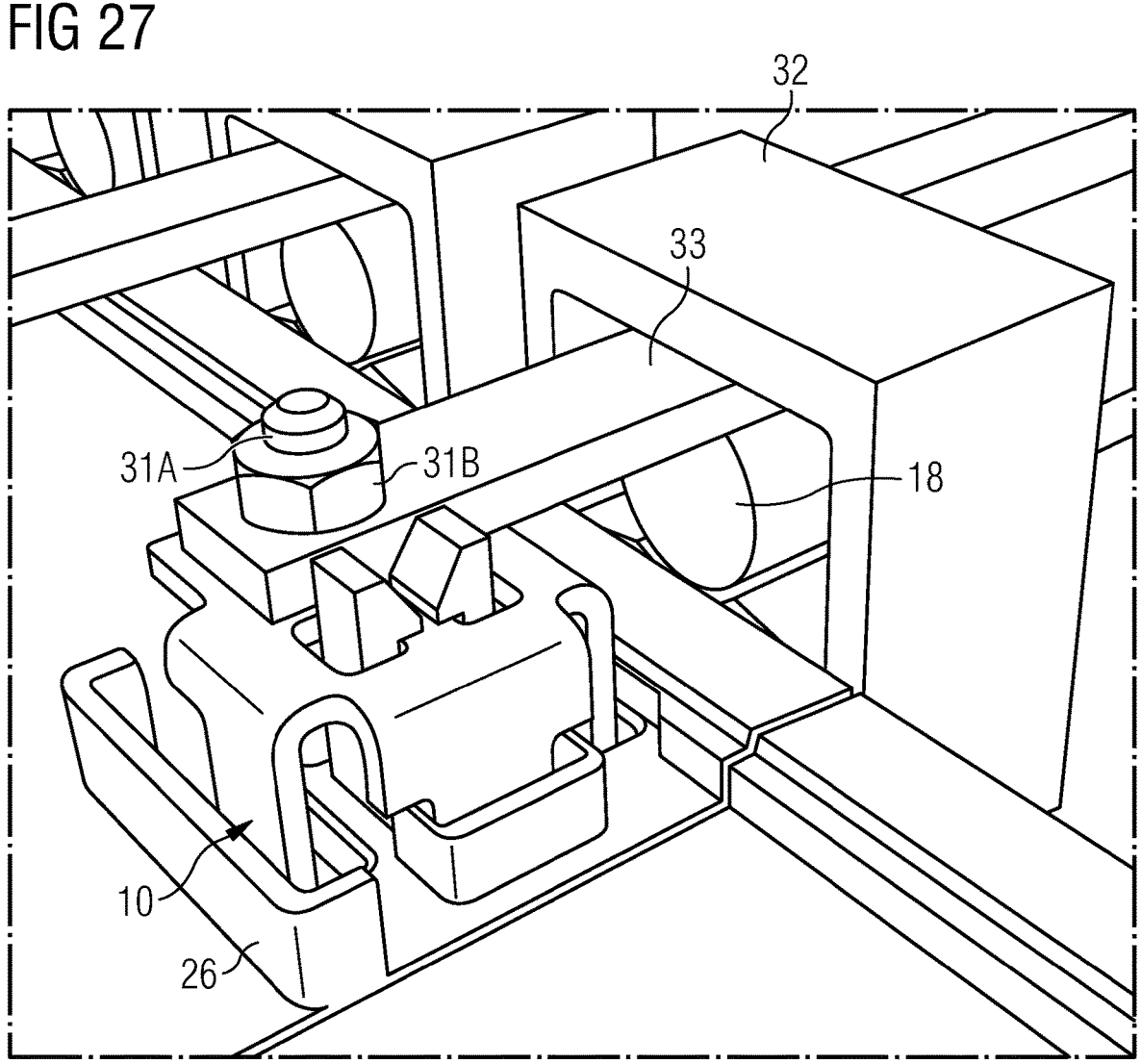

FIG. 13A, 13B show further detailed views for illustrating the electrical connection between a power feed-in plug and a power busbar encapsulated by a busbar board according to the present invention and of an electrical device connected simultaneously from the front side of the busbar board wherein the housing of the illustrated power-feed-in plug and the rear side cover plate of the busbar board is removed;

FIG. 14 shows a further view for illustrating a power feed-in by means of power feed-in plugs;

FIG. 15 shows a detailed view for illustrating a mounting of a busbar board to a mounting frame with a latching element in a parking position fixed for removing the busbar board from a mounting frame;

FIG. 16 shows a further view for illustrating the mounting of a busbar board to a mounting frame with a latching element in a final position fixing the busbar board mechanically to a mounting frame;

FIG. 17 shows an embodiment where a busbar board according to the present invention is connected to a mounting plate;

FIG. 18 shows a further view where a busbar board according to the present invention is mounted to a mounting plate;

FIG. 19 shows a view for illustrating a busbar board according to the present invention mounted to a mounting plate and provided for receiving electrical devices at the front side;

FIG. 20 shows a further view for illustrating a busbar board according to the present invention mounted to a mounting plate;

FIG. 21 shows a detailed view for illustrating the feed-in of electrical power at the rear side of a busbar board by means of feed-in laminated copper bars;

FIG. 22 shows a further detailed view for illustrating electrical contacts used for feeding in electrical power by means of feed-in laminated copper bars at the rear side of a busbar board according to the present invention, wherein the cover hoods of the power-feed-in plugs are removed;

FIG. 23 shows a detailed view of the electrical connection of a feed-in laminated copper bars, wherein the housing of the illustrated power-feed-in plug is removed;

FIG. 24 shows a further embodiment of a busbar board according to the present invention where the feed-in of electrical power is performed by means of feed-in circular conductors;

FIG. 25 shows a rear side view on a busbar board according to the present invention using feed-in circular conductors for power supply feed-in;

FIG. 26 shows a further detailed view for illustrating a power feed-in using feed-in circular conductors;

FIG. 27 shows a detailed view for illustrating the feed-in of electrical power using a feed-in circular conductor.

Figure 1:
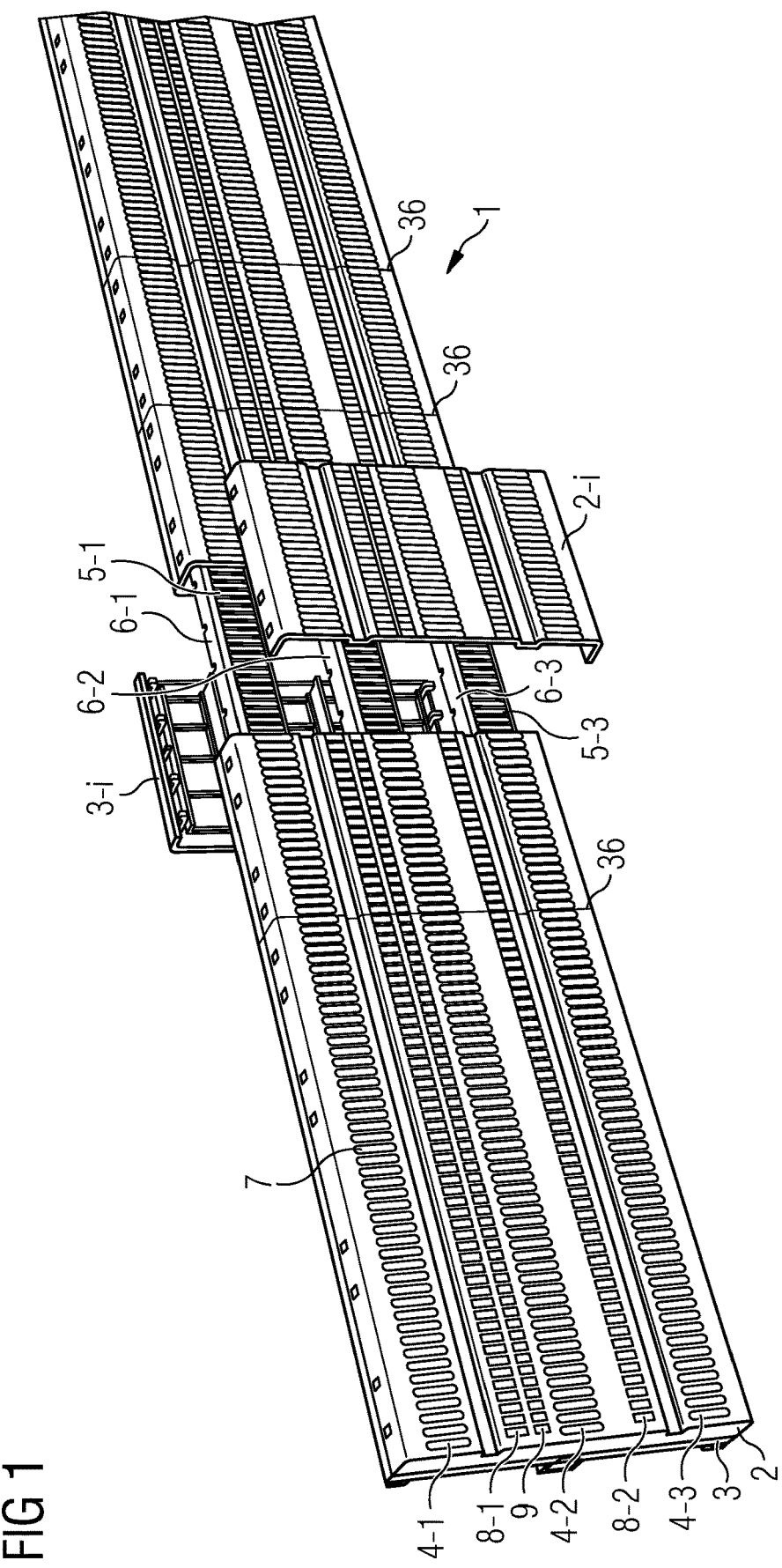
FIG. 1 shows a front perspective view on a possible embodiment of a busbar board according to the first aspect of the present invention.

As can be seen from the perspective front side view illustrated in FIG. 1, a busbar board 1 according to the first aspect of the present invention can comprise several busbar board segments 1-$i$ encapsulating power busbars 6 of a power busbar system. In the illustrated embodiment of FIG. 1, the busbar board 1 comprises a front side touch protection cover plate 2 with one or more segments connected mechanically to a touch protection base plate 3 having also one or more segments which cover the power busbars enclosed by the busbar board 1 from behind. The busbar board 1 may also referred to as crossboard 1. The front side touch protection cover plate 2 can be used for connecting a plurality of electrical devices 11 (as shown in FIG. 19) to the power busbars 6 enclosed by the busbar board 1. In the illustrated embodiment of FIG. 1, the busbar board 1 is provided for encapsulating at least three power busbars 6 which run in parallel within the busbar board 1. The front side touch protection cover plate 2 has several rows 4-1, 4-2, 4-3 of feedthrough openings or slots 7 extending in parallel to the enclosed power busbars 6 provided within the touch-protected busbar board 1. In the illustrated embodiment of FIG. 1, the busbar board 1 is provided for providing touch protection of three enclosed power busbars 6-1, 6-2, 6-3. Accordingly, the busbar board 1 has a corresponding number of three rows 4-1, 4-2, 4-3 of equidistant feedthrough openings 7. Each row 4-$i$ comprises a plurality of feed-through openings 7 which can be used to establish electrical connection between connection contacts of electrical devices 11 to be connected to the power busbar system and the touch-protected power busbars 6 enclosed by the busbar board 1. The touch protection cover plate 2 is adapted to cover the power busbars 6 each having a plurality of contact openings 5 lying directly beneath the corresponding feedthrough openings 7 of the touch protection cover plate 2 as illustrated in FIG. 1. Accordingly, each segment 1-$i$ of the busbar board 1 comprises a front side touch protection cover plate segment 2-$i$ and a touch-protected base plate segment 3-$i$ which can be connected with each other mechanically as also illustrated in more detail in FIG. 2. The front side protection cover plate 2 and the touch protection base plate 3 can be made of several segments 2-*i*, 3-*i*, respectively. Between the segments expansion joints 36 can be provided to compensate for thermal expansion of the plastic material caused by temperature increase as also shown in FIG. 1. The front side touch protection cover plate 2 covers the power busbars 6 from the front side. In contrast, the touch protection base plate 3 covers the power busbars 6 enclosed by the busbar board 1 from behind. The power feed-in of electrical power into the power busbar 6 enclosed by the busbar board 1 is provided by power feed-in plugs 10 being pluggable into corresponding sockets of the touch protection base plate 3 of the busbar board 1 as illustrated in more detail for example in FIG. 9 and FIG. 14. The contours 37 such as notches and corresponding protruding contours at the base plate segment 3-*i* can be provided to perform an alignment of the contact opening grid and the feed-through opening grid of the feed-through openings 7 (formed both by a grid of equivalent slots) as shown in FIG. 2.

Figure 4:
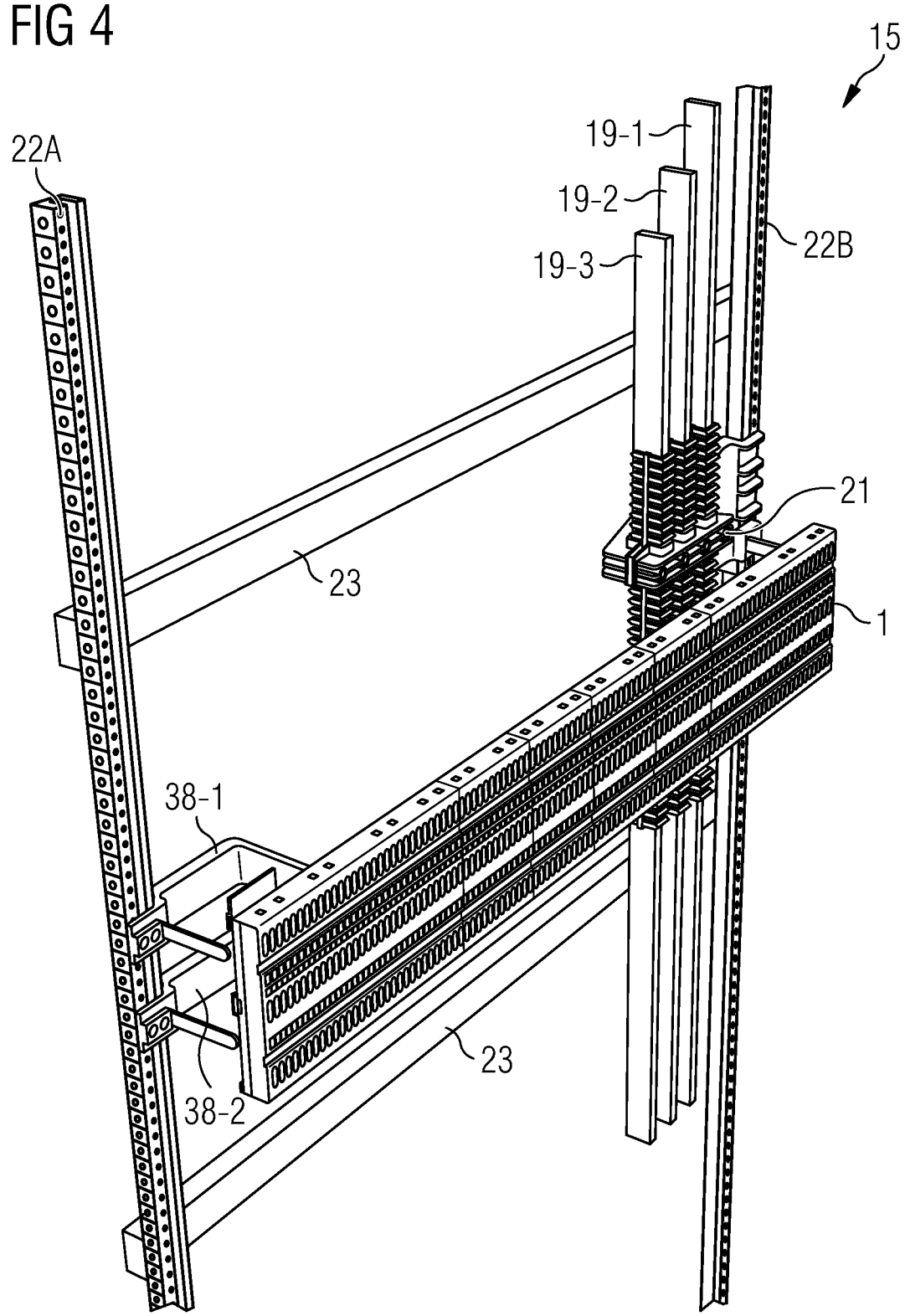
FIG. 4 shows a perspective front view of a possible embodiment where the busbar board according to the present invention is attached to a mounting frame.
Figure 5:
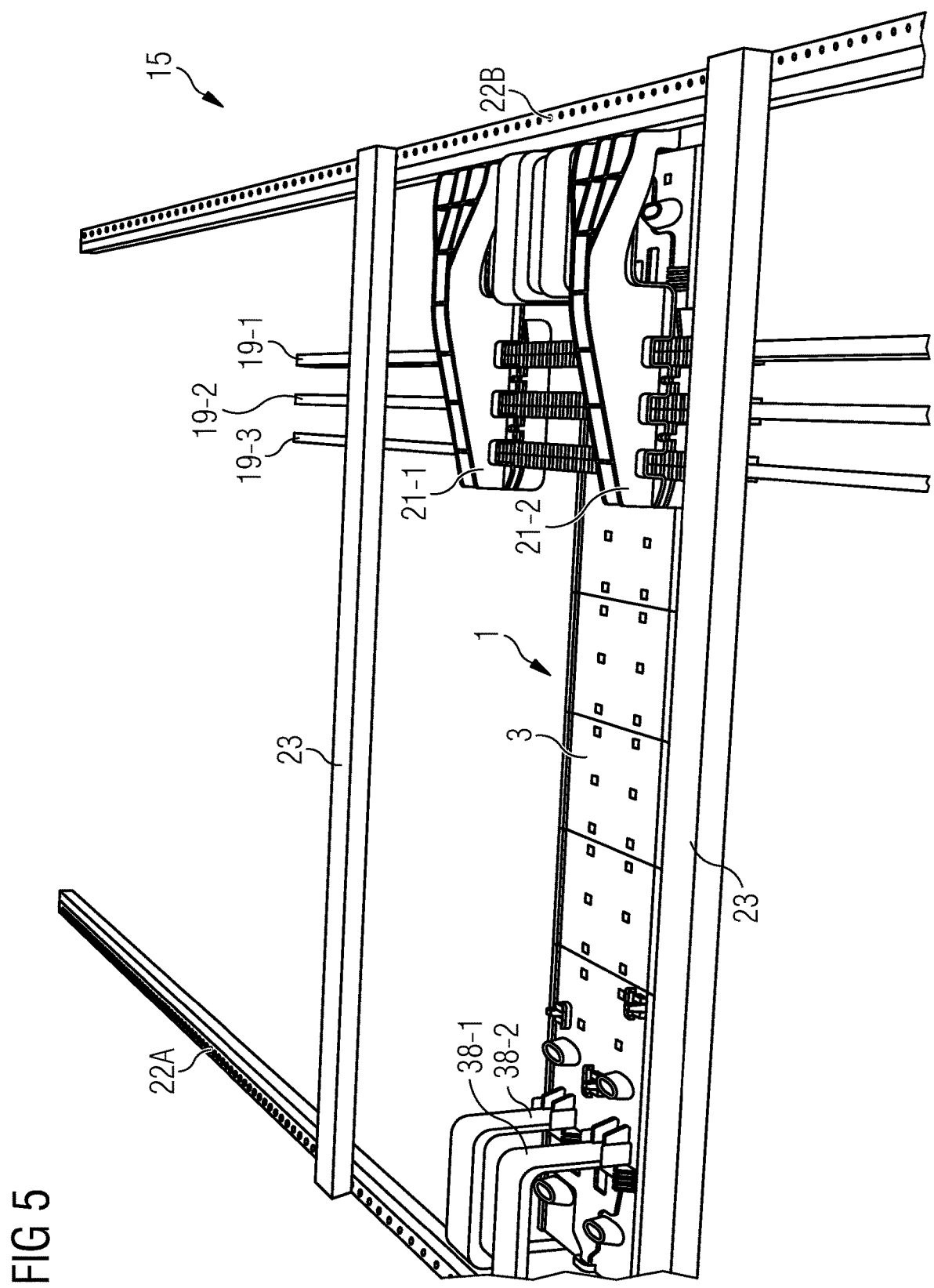
FIG. 5 shows a rear view on a busbar board connected to a mounting frame.
Figure 6:
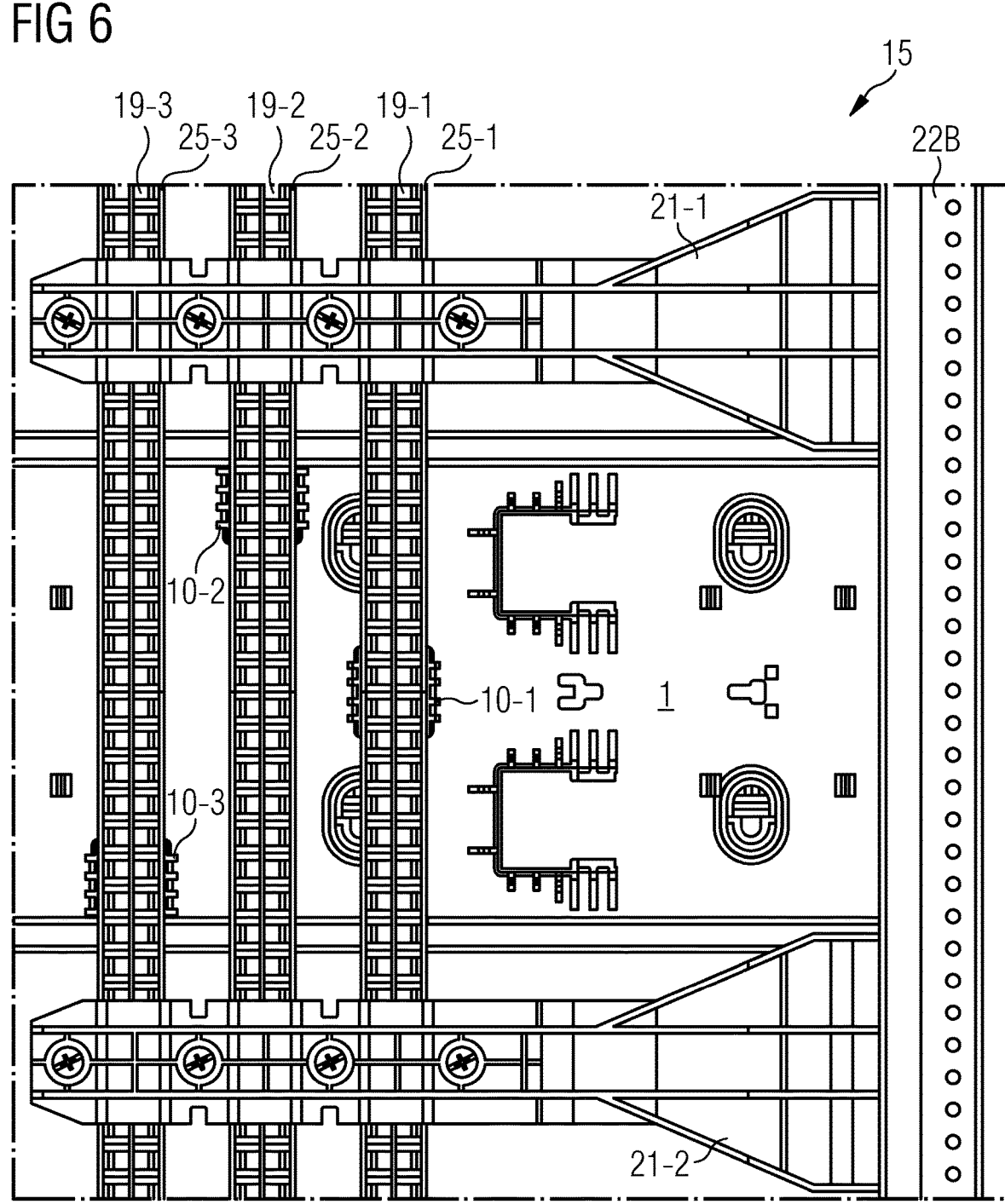
FIG. 6 shows a rear view of a busbar board connected to a mounting frame.

The busbar board 1 as shown in FIG. 1 can in a possible implementation be attached to a mounting frame 15 as illustrated in FIGS. 4, 5 or to a mounting plate 16 as illustrated in FIG. 17. The busbar board 1 shown in FIG. 1 comprises several elongated electrically conductive power busbars 6 which are arranged in parallel and which are connectable by means of associated feed-in plugs 10 from behind to provide a rear side power feed-in. In a possible embodiment, the power busbars 6 arranged within the busbar board 1 each comprises a U-shaped cross profile as also visible in FIG. 2. The power busbars 6 having the U-shaped cross profile comprise sidewalls 6A, 6B facing each other. The sidewalls 6A, 6B of each U-shaped power busbar 6 are connected with each other by means of a connecting bridge 6C. The connecting bridge 6C comprises the contact openings 5 for insertion of resilient electrical connection contacts 13A and their neighboring protection ribs 13B as also shown in FIGS. 13A, 13B. Each electrical contact 13A is in a possible implementation surrounded by neighboring protection ribs 13B at its left and right side. The two protection ribs 13B of an electrical contact 13A protect this electrical contact 13A against mechanical damage and provide additional mechanical support of an inserted electrical device 11. The device 11 is connected to the busbar board 1 from the front side.

In an alternative embodiment the power busbar 6 can also comprise another cross-section shape, in particular a rectangular cross-section shape or an L-shape.

Figure 2:
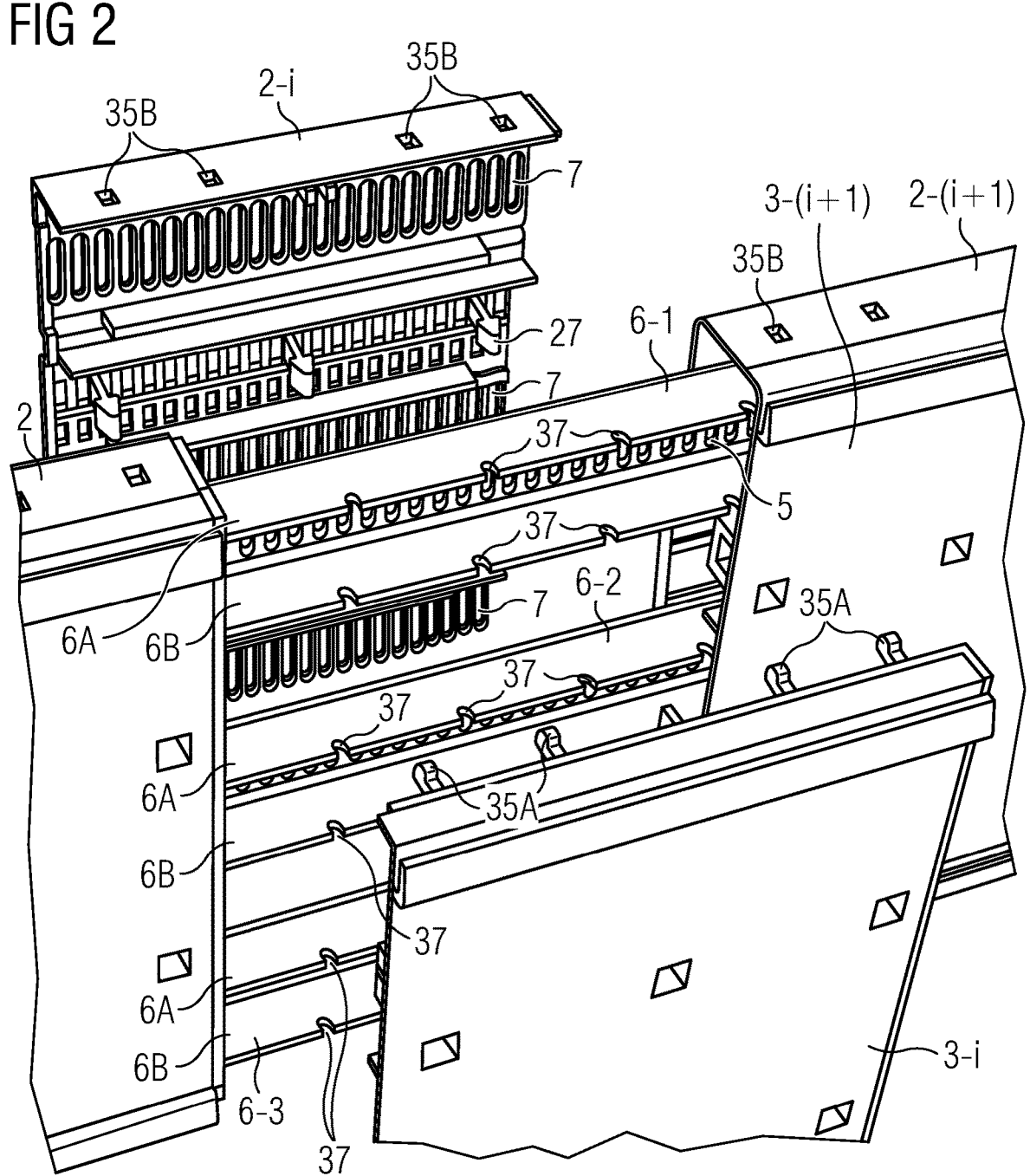
FIG. 2 shows a detailed perspective rear view on the busbar board segments of the busbar board illustrated in FIG. 1.
Figure 11:
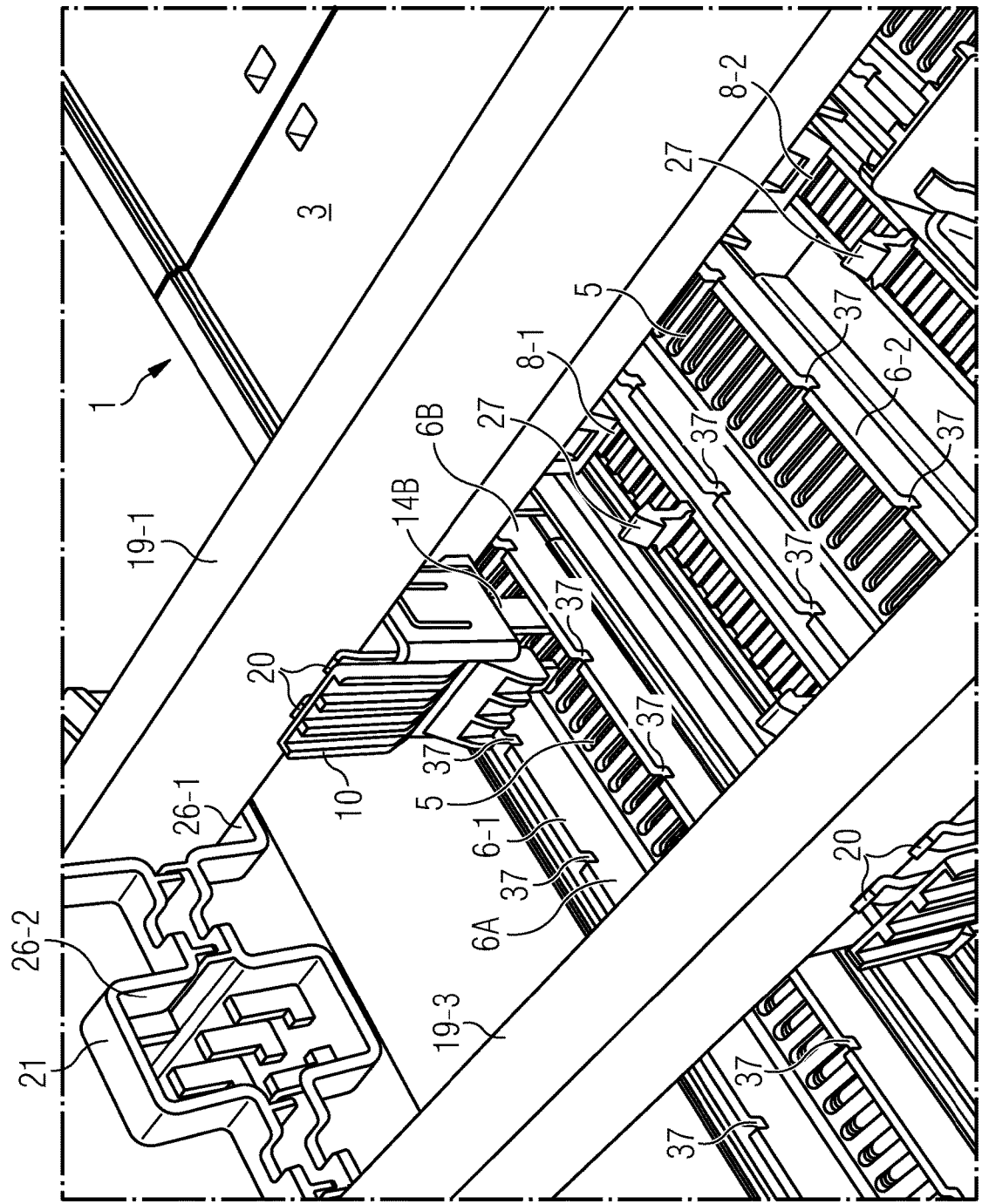
FIG. 11 shows a view for illustrating the electrical connection between an external feed-in power busbar with an internal power busbar encapsulated by the busbar board according to the present invention by means of a power feed-in plug, wherein the rear protection cover is partially removed.

As illustrated in FIGS. 1, 2, the busbar board 1 consists of a front side touch protection cover plate 2 and a touch protection base plate 3 which are both firmly connected to each other. In a possible implementation, the front side touch protection cover plate 2 is clipped into clipping holes 35B of the touch protection base plate 3 by means of clip connections 35A as shown in FIG. 2 and by means of arrow-shaped clipping hooks 27 as shown in FIG. 2 and FIG. 11. In alternative implementations, the front side touch protection cover plate 2 and the rear side touch protection base plate 3 can also be screwed to each other or clued to each other. It is also possible to perform ultra sound welding or riveting. Both the front side touch protection cover plate 2 and the touch protection base plate 3 are made of an electrically insulating material. In a possible implementation, the front side touch protection cover plate 2 and the rear side touch protection base plate 3 can be fabricated of flame-retardant plastic. The electrically insulating flame-retardant plastic material of the front side touch protection cover plate 2 and the rear side touch protection base plate 3 has a relatively high thermal conductivity for dissipating heat and may comprise a relative high thermal expansion coefficient requiring the provision of expansion joints 36 in case of a relative long busbar board 1.

By using the busbar board 1 as illustrated in FIG. 1, it is possible to place various electrical devices 11, in particular switching devices or adapters for power switches or motor start-ers or other electronic devices 11, on the front side touch protection cover plate 2 with plug-in contacts 13A inserted into the contact openings 5 of the encapsulated power busbars 6 via the feed-through openings 7 for connecting the devices 11 to the power busbar system. FIG. 19 illustrates the connection of an electrical device 11 to a busbar board 1 mounted on a mounting plate 16.

The power busbars 6 encapsulated by the busbar board 1 comprise a plurality of uniformly spaced contact openings 5 of a contact opening array. Electrical connection contacts 13A protruding from a housing 12 of the electrical device 11 can be inserted along with their protection ribs 13B through the feedthrough openings 7 into the contact openings 5 lying directly beneath the feedthrough openings 7 to establish an electrical contact. The protruding connection contacts 13A of the electrical device 11 can be surrounded on both sides by contact protection ribs 13B which may protect the connection contacts from mechanical damage. The devices 11 to be connected to the power supply system can comprise for example motor-protective circuit breakers, power circuit breakers, fuse holders, fuse switches, electronic devices or any other switching device of a power distribution system or adapter. The electrical devices 11 can be plugged directly to the front side onto the busbar board 1 without the need of any kind of adapter devices or the necessity to use a tool.

In the embodiment illustrated in FIG. 1, the busbar board 1 is configured for three parallel power busbars 6 of a busbar system. Accordingly, in the illustrated embodiment, the front side touch protection cover plate 2 of the busbar board 1 comprises three rows 4-1, 4-2, 4-3 of feedthrough openings 7. The connecting contacts 13A of the electrical devices 11 and the protection ribs 13B are adapted in such a way that they may be passed through the feedthrough openings 7 of the front side touch protection cover plate 2 and, after passing through, may be inserted into correspondingly arranged contact openings 5 of the pre-determined matching contact opening array of the electrically conductive power busbars 6 enclosed by the insulating busbar board 1. In the illustrated embodiment of FIG. 1, the contact openings 5 lying directly beneath the feedthrough openings 7 are slot-shaped. Alternatively, the contact openings 5 and the feed-through openings 7 can also be circular, elliptical, square or triangular. In the illustrated embodiment of FIG. 1, the front side touch protection plate 2 of the busbar board 1 comprises two rows 8-1, 8-2 of contours or slots which are provided for receiving interlocks of installed devices 11 provided for the mechanical connection to the busbar board 1. The interlocks can secure the devices 11 against being pulled unintentionally for-ward.

In a further possible embodiment, a row 9 of contours or slots can also be provided into which reverse polarity protection ribs of the connected devices 11 may engage. The contours or slots of row 9 within the front side touch protection cover plate 2 of the busbar board 1 can prevent electrical devices 11 from being plugged onto the busbar board 1 with incorrect polarity or incorrect orientation. Due to the arrangement of the various feed-through slots 7, the locking contours and reverse polarity protection contours or the reverse polarity protection ribs of the devices 11, the entire busbar board 1 can be equipped conveniently and fast with electrical devices 11 without wasting any mounting space.

In the illustrated embodiment of FIGS. 1, 2, the busbar board 1 is provided for receiving three power busbars 6 which can be provided for different current phases L1, L2, L3. The number of power busbars 6 encapsulated by the busbar board 1 may vary for different use cases. For each power busbar 6 enclosed by the busbar board 1, a corresponding power feed-in plug 10 can be provided which can be plugged in a corresponding socket 26 of the touch protection base plate 3 of the busbar board 1 as shown in FIG. 14.

Figure 12:
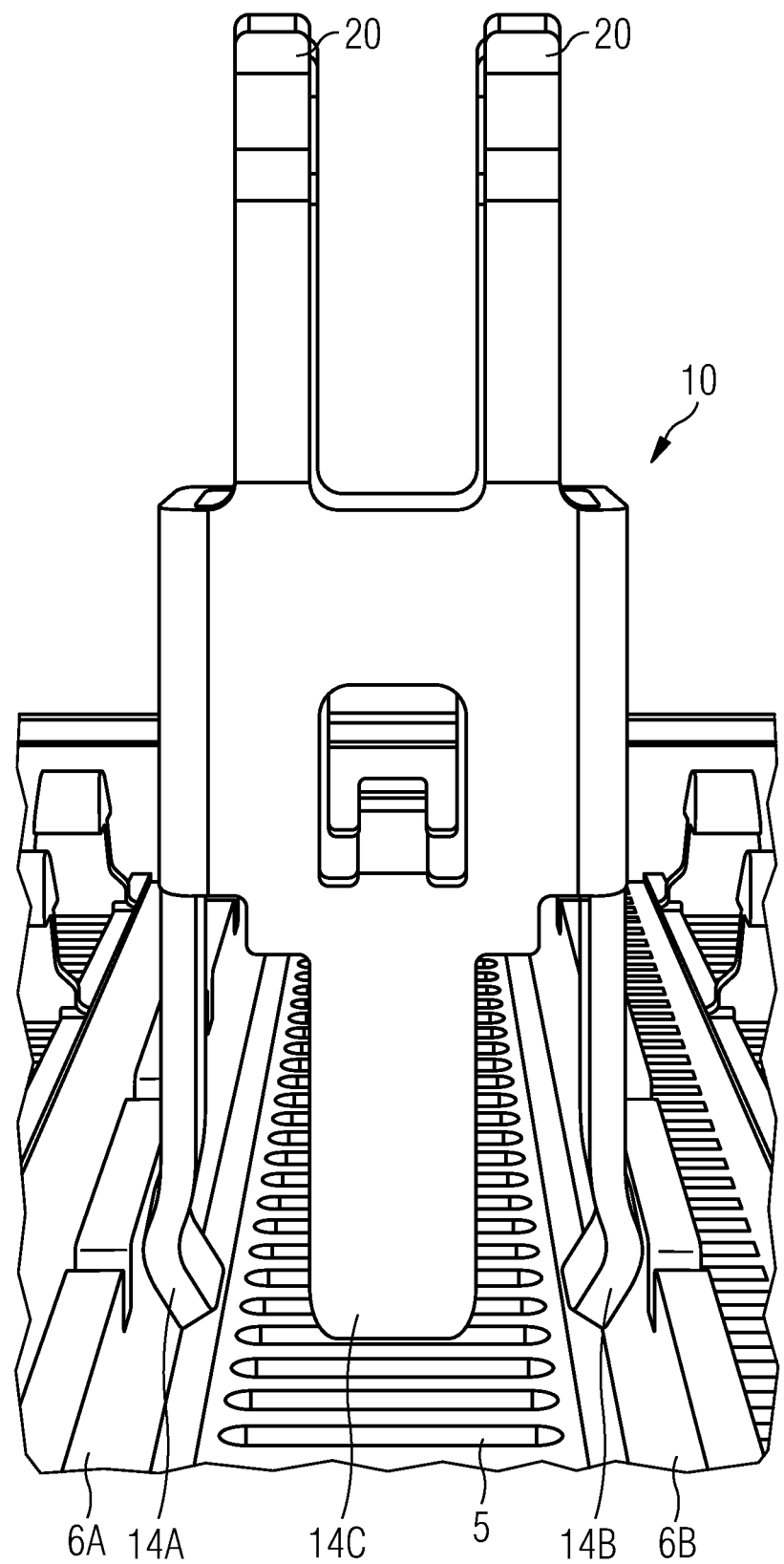
FIG. 12 shows a detailed view on a power feed-in plug used to feed-in electrical power into a power busbar encapsulated by the busbar board according to the present invention wherein the housing of the illustrated power-feed-in plug on the rear side cover plate of the busbar board is removed.

The power feed-in plugs 10 comprise in a preferred embodiment contact tongues 14A, 14B as illustrated for example in FIGS. 12, 13A, 13B. The contact tongues 14A, 14B face each other and can abut one or both sidewalls 6A, 6B of the corresponding power busbar 6 from the inside as shown in FIGS. 12, 13A, 13B. In an alternative embodiment, the contact tongues 14A, 14B of the power feed-in plugs 10 can also abut one or both sidewalls 6A, 6B of the corresponding power busbar 6 from the outside. In a still alternative implementation, the contact tongues 14A, 14B can also be lyra-shaped to embrace one or both sidewalls of a corresponding power busbar 6 to establish an electrical contact. Lyra-shaped contact tongues 14A, 14B may also embrace a power busbar 6 having a rectangular cross section. The power busbars 6 may also have a different cross-section shape, e.g. L-shape.

In a possible embodiment, the power feed-in plugs 10 provided for the feed-in of electrical power into the different power busbars 6 enclosed by the busbar board 1 can also be integrated in a single multipole feed-in plug module. The front side touch protection cover plate 2 of the busbar board 1 as illustrated in FIG. 1 can be covered completely with devices 11 having electrical connection contacts 13A passing through the feedthrough openings 7 of the touch protection cover plate 2 and being received by contact openings 5 of a contact opening grid of the power busbar 6 to establish an electrical connection between the device 11 and the busbar system.

The rear side power feed-in for the power busbars 6 enclosed by the busbar board 1 by means of the rear side feed-in plugs 10 can be performed in a possible embodiment by means of load break switches and/or current protection elements located at the rear side of the busbar board 1. These load break switches or current protection elements can be either operated from the front side or can be controlled by means of a specific control device 11 connected to the front side of the busbar board 1. The current protection elements can comprise controllable electronic current protection elements or current protection fuses. The current protection element can comprise an apparatus for electronic protection of a device or load connected to the power busbar system. An overcurrent protection integrated in the busbar board 1 or into the pluggable power feed-in plugs 10 protects initially the busbar board 1 as a whole and consequently all devices 11 mounted on said busbar board 1. In a possible implementation, the current protection element can comprise a power switch from which the connected load or device 11 receives an electrical current from the power busbar system. The protection element can further comprise a sensor component connected in series with the power switch and adapted to generate directly an electrical voltage drop corresponding to a current rise speed of the electrical current I flowing via the sensor component of the current protection element and via the power switch of the current protection element to the load of the electrical device 11. The current protection element can further comprise a driver circuit adapted to detect an occurring overcurrent depending on the voltage drop generated by the sensor component and to switch off the power switch automatically upon detection of an overcurrent within a short switch-off period of e.g. less than 5 microseconds to protect the power switch and the load of the electrical device 11. The voltage drop generated by the sensor component and the voltage drop along the power switch can be applied as a sum voltage to the driver circuit of the current protection element. The sensor component of the current protection element can comprise a coil which is adapted to generate an induction voltage depending on the electrical current I flowing through the sensor component and through the power switch to the connected load of the electrical device 11.

The touch-protected busbar board 1 as illustrated in FIG. 1 comprises several parallel power busbars 6. Besides the power busbar 6, there can also be integrated electrical data lines providing communication between the connected devices 11. In an alternative embodiment, the devices 11 connected to the power busbar system may communicate directly with each other via the power busbar 6 by means of powerline communication PLC. In a still further possible alternative embodiment, the devices 11 connected to the busbar system may communicate with each other via wireless radio interfaces. The feed-in plugs 10, the feed-in plug module or the touch-protected busbar board 1 may comprise in a possible implementation measuring modules provided for performing a current and/or voltage measurement to generate measurement values output by means of data interfaces to a data processing unit connected to the busbar board 1. In a further possible embodiment, the touch-protected busbar board 1 can also comprise electrical supply lines or supply busbars for supplying measuring modules or transceivers provided within the touch-protected busbar board and/or connected devices 11 with auxiliary supply voltages which are also feed-in from the rear side by means of the feed-in plugs 10. Also data lines integrated in the busbar board 1 can in a possible implementation be contacted from the rear side by means of corresponding plugs. These plugs can be integrated in a plug module. The auxiliary supply voltage can also be generated by transforming the received power supply voltages.

The touch-protected busbar board 1 shown in FIG. 1 can also comprise mechanical connection elements used for connecting the busbar board 1 with other similar busbar boards.

In a possible embodiment, the touch-protected busbar board 1 comprises a first power busbar 6 for different current phases L of the busbar power system and additional second busbars for protection bars P, N of the power busbar system. The device 11 connectable to the front side of the busbar board 1 can comprise an electric, electronic or electromechanical device which comprises electrical connecting contacts 13A protruding from the bottom side of a housing of the device 11. The device 11 can further comprise protection ribs and/or latching elements for establishing a mechanical connection with the busbar board 1. In a preferred embodiment, the busbar board 1 is connectable without using a mechanical tool to corresponding counter-contours of a mounting plate 16 or of a mounting frame 15. In a preferred embodiment of the busbar board 1 according to the present invention, the feed-in plugs 10 plugged into sockets 26 at the rear side of the busbar board 1 can be locked mechanically. The feed-in plugs 10 may be mounted without using a tool. In contrast, the removal of the feed-in plugs 10 can be performed in a preferred embodiment only with a tool (similar to a crossboard or busbar board removal).

Figure 3:
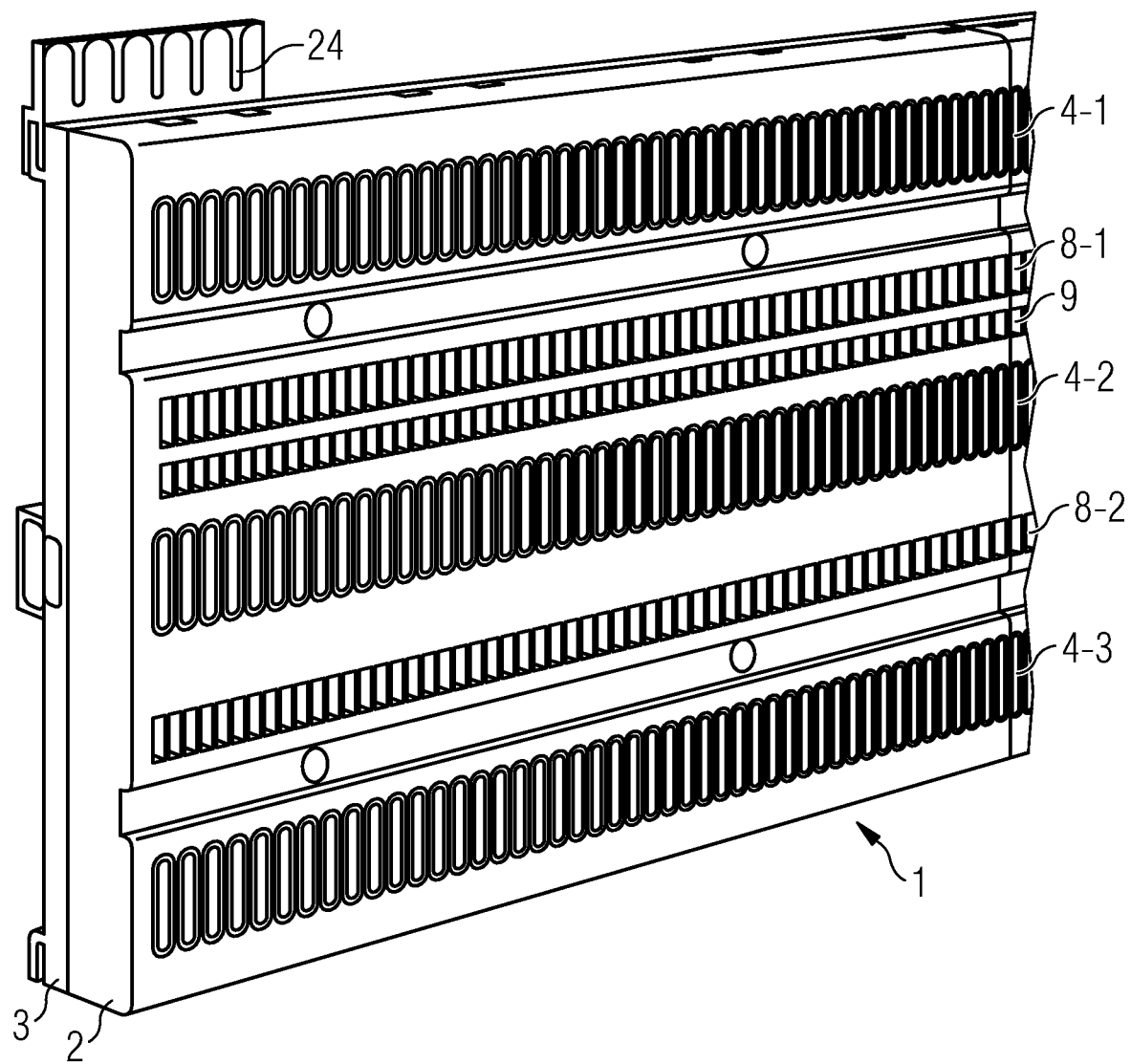
FIG. 3 shows a further detailed view on the busbar board illustrated in FIG. 1.

The busbar board 1 as shown in FIG. 1 comprises in a preferred embodiment an elongated shape wherein further elements can be attached on one or both long sides of the busbar board 1. For example, as shown in FIG. 3, the busbar board 1 can be adapted to receive a system element 24 from the upper side of the mounted busbar board 1. This element 24 can for instance comprise a wiring comb attachable to the upper side of the busbar board 1 used for mounting electrical wires of devices 11. There can be many different types of extension elements 24 be attached to the busbar board 1. These extension elements 24 comprise for instance additional power busbar modules or adapter elements.

Figure 9:
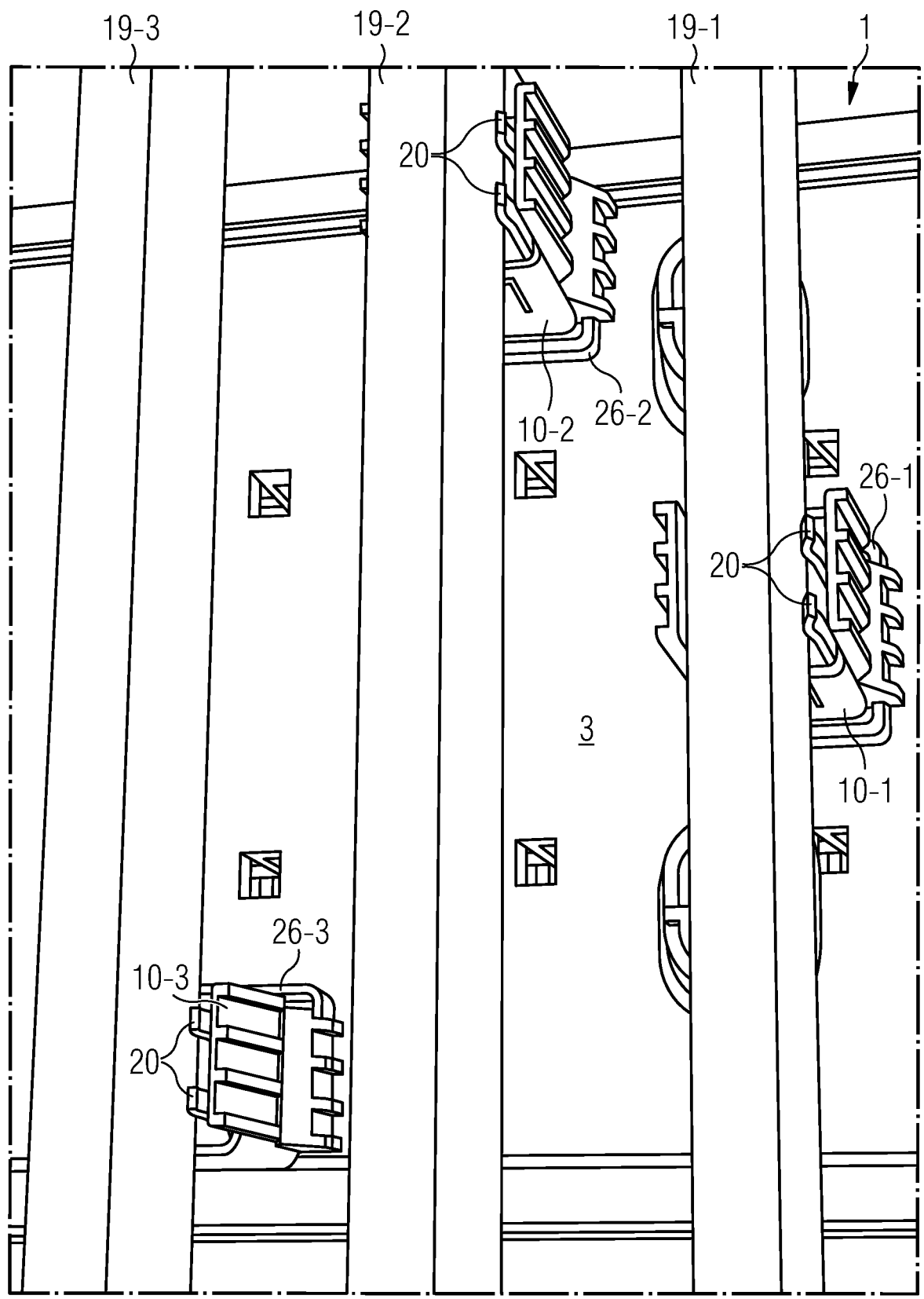
FIG. 9 illustrates a power feed-in by means of power feed-in plugs provided at the rear side of a busbar board according to the present invention receiving power from external feed-in power busbars attached to a mounting frame.

FIG. 4 shows an embodiment where a busbar board 1 according to the present invention is attached to a mounting frame 15. In the illustrated embodiment of FIG. 4, the mounting frame 15 comprises two parallel vertical struts 22A, 22B. The vertical struts 22A, 22B are connected to each other by means of one or more cross-struts 23 as shown in FIG. 4. In the illustrated embodiment of FIG. 4, there are three feed-in power busbars 19 which are attached by means of at least one busbar support element 21 to one of the vertical struts 22 of the mounting frame 15. In a preferred embodiment, the external feed-in power busbars 19 are touch-protected and are oriented in a vertical direction. The number of feed-in power busbars 19 corresponds in a preferred embodiment to the number of internal power busbars 6 enclosed by the busbar board 1. Each power busbar 6 enclosed by the busbar board 1 is connected to an associated external feed-in power busbar 19 by means of an associated power feed-in plug 10. The power feed-in plugs 10 are provided at the rear side of the busbar board 1. The feed-in power busbars 19 are directed perpendicular or crosswise to the power busbars 6 enclosed by the busbar board 1. In a possible embodiment, the power feed-in plugs 10 provided for the feed-in of electrical power into the different power busbars 6 enclosed by the busbar board 1 can comprise each at the rear side lyra-shaped resilient flexible contact tongues 20 as shown in FIG. 9. The contact tongues 20 are facing each other and can abut the associated feed-in power busbar 19 to provide an electrical contact. The busbar board 1 can be attached mechanically to counter-contours of the mounting frame 15 by means of bracket elements, angled elements, adapter elements or other latching elements.

FIG. 5 shows a further view on an embodiment where a busbar board 1 is attached to a mounting frame 15. FIG. 5 shows the rear side of the busbar board 1 connected mechanically to the mounting frame 15. As can be seen in FIG. 5, the feed-in power busbars 19 are attached by means of support elements 21 to a strut 22B of the mounting frame 15. In the embodiment shown in FIG. 5, the busbar board 1 is attached to the mounting frame 15 by means of two busbar support elements 21-1, 21-2. Each busbar support element 21 is adapted to receive the feed-in power busbars 19. In the illustrated embodiment of FIG. 5, the busbar support elements 21 are adapted to receive three feed-in power busbars 19-1, 19-2, 19-3. The feed-in power busbars 19 may comprise in a possible implementation different cross sections. In the illustrated embodiment, the busbar support elements 21 are adapted to receive feed-in power busbars 19 with different variable cross sections and comprise corresponding mechanical adjustment elements.

Figure 7:
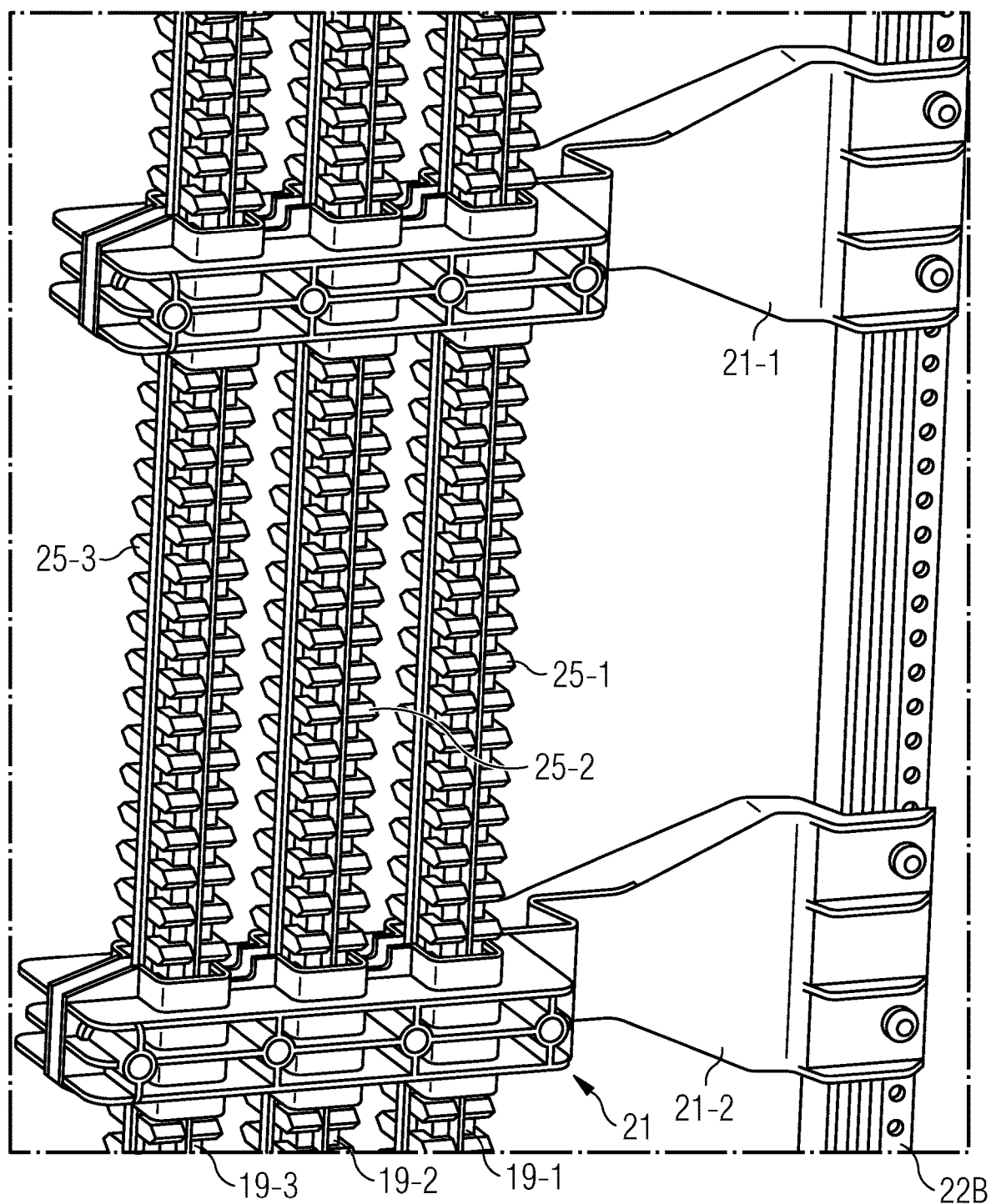
FIG. 7 shows a further view for illustrating an attachment of feed-in power busbars to a mounting frame by means of support elements.
Figure 8:
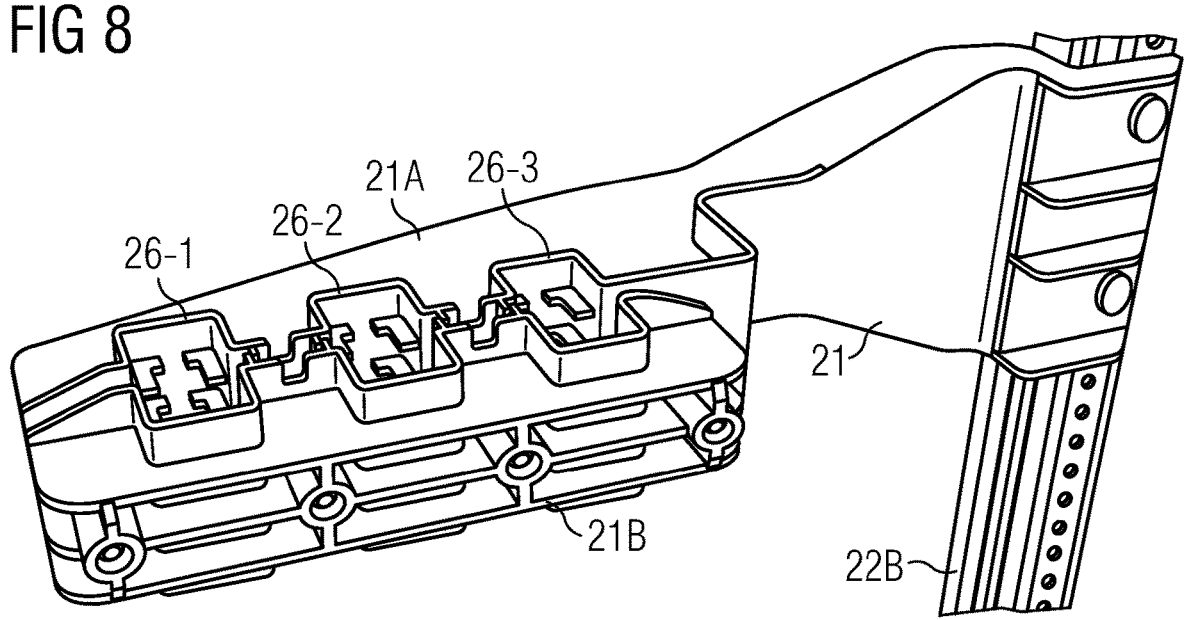
FIG. 8 shows a detailed view on a support element as shown in FIG. 7.

FIGS. 7, 8 show a more detailed view on the support elements 21-1, 21-2 for receiving feed-in power busbars 19.

FIG. 7 shows a view of the mechanical connection of the vertical feed-in power busbars 19 to the parallel vertical strut 22B of the mounting frame 15. In a preferred embodiment, each feed-in power busbar 19 can comprise a touch protection 25-1, 25-2, 25-3 covering the feed-in power busbar 19 at least partially. It is also possible that all feed-in busbars 19 are covered by a common touch protection element. Each external feed-in power busbar 19-1, 19-2, 19-3 is connected at the rear side of the busbar board 1 by means of an associated power feed-in plug 10-1, 10-2, 10-3 to a corresponding integrated power busbar 6-1, 6-2, 6-3.

FIG. 8 shows a busbar support element 21 in more detail. The busbar support element 21 comprises reception contours 26-1, 26-2, 26-3 to receive corresponding feed-in power busbars 19-1, 19-2, 19-3 which can comprise different cross sections. The busbar support element 21 comprises in the illustrated embodiment two parts 21A, 21B which can be mechanically connected by means of screws. The feed-in power busbars 19 are inserted into the receiving contours 26 before the two parts 21A, 21B of the support element 21 are screwed together.

FIG. 9 shows the feed-in power busbars 19-1, 19-2, 19-3 without illustrated touch protection connected electrically by means of contact tongues 20 of power feed-in plugs 10-1, 10-2, 10-3. The power feed-in plugs 10-1, 10-2, 10-3 are provided for the feed-in of electrical power into the encapsulated power busbars 6 enclosed by the busbar board 1. Each feed-in plug 10 can comprise at the rear side flexible contact tongues 20 which are facing each other and which may abut associated feed-in power busbars 19 to establish an electrical connection. The power feed-in plugs 10 can be plugged into corresponding sockets 26 provided at the touch protection base plate 3 of the busbar board 1. The illustrated flexible tongues 20 can be resilient and can be made of a copper material. In an alternative embodiment the contact tongues 20 can be attached to mechanical springs.

Figure 10:
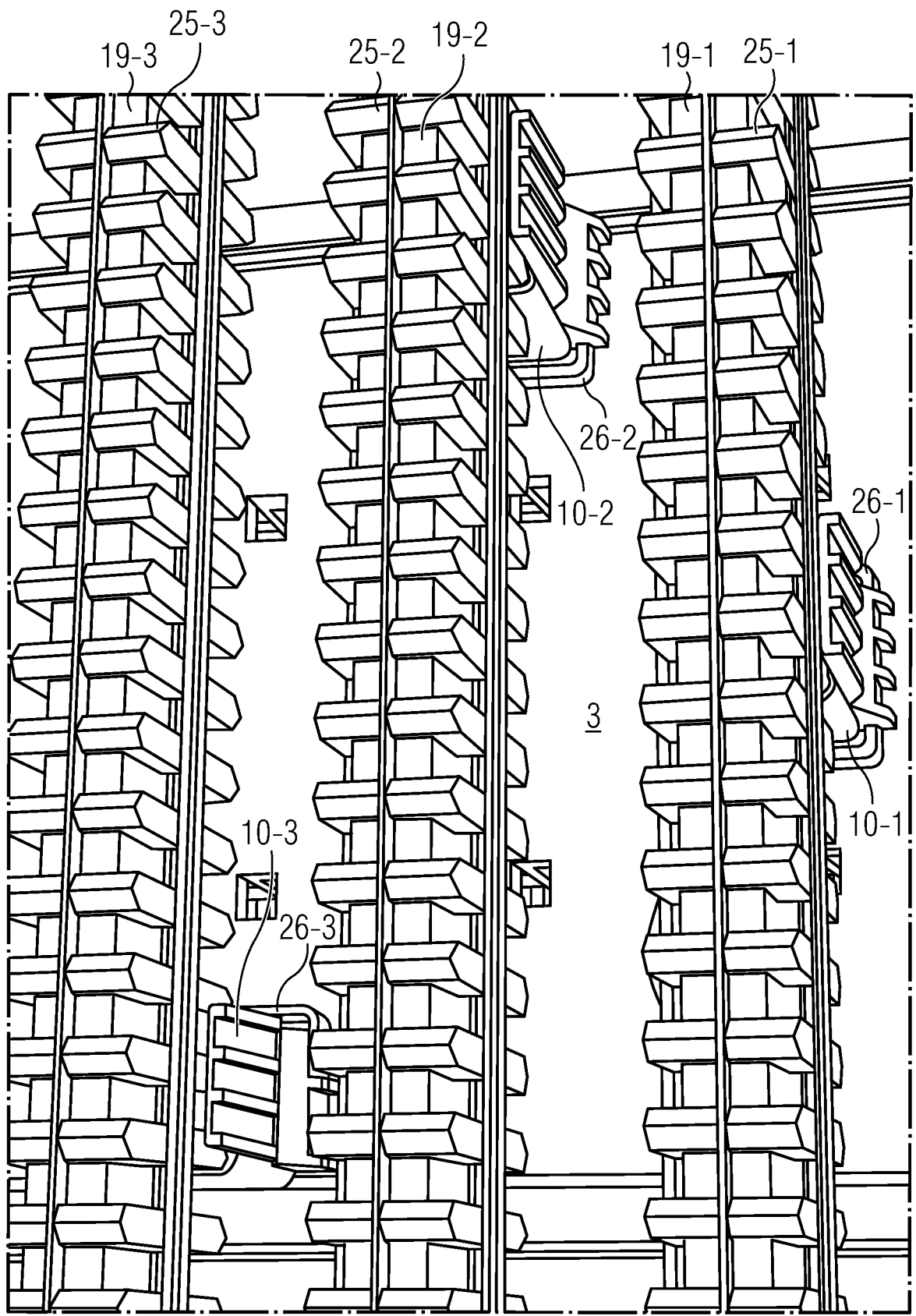
FIG. 10 illustrates an implementation where the external feed-in power busbars are touch-protected.

FIG. 10 shows a similar view as FIG. 9, however, with touch-protected feed-in power busbars 19. FIGS. 9, 10 illustrate the sockets 26 provided at the touch protection base plate 3 for receiving corresponding power feed-in plugs 10-1, 10-2, 10-3 which in turn are electrically connected to the feed-in power busbars 19 by means of electrical contacts 20.

FIG. 11 shows a further view for illustrating the electrical connection between the integrated encapsulated power busbars 6-$i$ and the external feed-in power busbars 19-$i$. In the illustrated view of FIG. 11, the feed-in power busbar 19-2 and the touch protection base plates are not shown to provide a clearer view on the connection of feed-in power busbar 19-1 with the corresponding integrated power busbar 6-1. The contact tongues 20 of the feed-in plug 10 are pressed against the feed-in power busbar 19 at the rear side of the busbar board 1 and are electrically connected to contact tongues 14A, 14B on the opposite side of the power feed-in plug 10. The feed-in power busbars 19-1, 19-3 are supported by a mechanical support element 21 also visible in FIG. 11.

FIG. 11 shows also rows 8-1, 8-2 having equidistant slots provided for receiving latching contours 27 of device latch elements 39 of device 11 used to provide mechanical support as also visible in FIG. 13B. The arrow shaped contours 27 shown in FIG. 11 are used to connect both housing halves of the busbar board 1, i.e. the upper housing part formed by the front cover plate 2 and of the rear part formed by the base plate 3.

FIG. 12 shows the electrical connection by means of a power feed-in plug 10 without its plastic housing in even more detail. In the illustrated embodiment of FIG. 12, the power feed-in plug 10 comprises contact tongues 14A, 14B facing each other and pressed against sidewalls 6A, 6B of a power busbar 6 from the inside. On the opposite side of the contact tongues 14A, 14B, FIG. 12 illustrates resilient flexible contact tongues 20 which are attached to the external feed-in power busbar 19. The contact tongues 20 and the contact tongues 14A, 14B are electrically connected with each other. The number of contact tongues can vary depending on the requirements of the use case. Electrical power supplied by an external power supply system to the external feed-in power busbars 19 is supplied via the contact tongues 20 integrated in the power feed-in plug 10 to the contact tongues 14A, 14B pressed against the sidewalls 6A, 6B of the power busbars 6 which receive the electrical power via the contact tongues 14A, 14B. In a possible implementation, the feed-in plug 10 may comprise additionally a central element 14C.

FIG. 13 illustrates the electrical connection between the contact tongues 14A, 14B and the sidewalls 6A, 6B of the power busbar 6 in more detail. In FIGS. 13A, 13B, the protruding electrical contacts 13A which are inserted along with their protection ribs 13B into the receiving contact openings 5 of power busbar 6 are illustrated.

FIG. 14 shows a further rear view on a busbar board 1 connected by means of rear side power feed-in plugs 10 to feed-in power busbars 19. The power feed-in plugs 10 are pluggable into corresponding sockets 26 provided within the touch protection base plate 3 at the rear side of the busbar board 1. FIG. 14 illustrates the resilient flexible contact tongues 20 providing the electrical connection to the feed-in power busbar 19. On the opposite side, the contact tongues 14A, 14B providing electrical contact to the integrated power busbars 6 encapsulated by the busbar board 1 are also visible. The power feed-in plugs 10-*i* can also be integrated into a common multipole feed-in plug module. In a possible embodiment, the power feed-in plugs 10 can be plugged into the corresponding sockets 26 to establish electrical connection. In a possible implementation, the plugged-in pluggable power feed-in plugs 10 can be mechanically locked before mounting the busbar board 1 to the mounting frame 15 or to the mounting plate 16. The locking can be performed for example by two clipping hooks facing each other and provided at the socket 26, as illustrated in FIG. 14.

FIGS. 15, 16 illustrate a mechanical connection of the busbar board 1 to a vertical strut 22A of the mounting frame 15 by means of two bracket elements 38-1, 38-2 and a latching element 28 which can be operated between two positions by a user or operator. FIG. 15 shows the latching element in a first position and FIG. 16 in a second position. The busbar board 1 can be attached by means of the latching mechanism 28 to counter-contours of the holding bracket elements 38-1, 38-2. In a preferred embodiment, the busbar board 1 is mechanically connectable to the mounting frame 15 without using a mechanical tool. Removing or detachment of the busbar board 1 in contrast can require the use of a mechanical tool such as a screwdriver used for shifting the latching element 28 between the two positions illustrated in FIGS. 15, 16. Accordingly, in a preferred embodiment, the busbar board 1 according to the present invention can be detached from the mounting frame 15 or from a mounting plate 16 by using a mechanical tool to operate the mechanical latching element 28 as illustrated in the implementations of FIGS. 15, 16. The mechanical latching element 28 engages the mounting brackets 38-1, 38-2 and can be shifted along the busbar board 1.

All elements shown in FIGS. 18 to 27 in context with a mounting plate 16 can also be provided in context with a mounting frame 15.

Further, in all variants it is possible to integrate measuring modules used to perform current and voltage measurements.

FIGS. 17, 18 illustrate an embodiment where the busbar board 1 is attached to a mounting plate 16. The busbar board 1 (which may also referred to as crossboard) can be screwed to the mounting plate 16 or can be clipped onto corresponding counter contours of the mounting plate without using a tool (similar to clipping on a mounting frame 15). In a possible embodiment, feed-in laminated copper busbars 17 can be provided on the surface of the mounting plate 16 for providing electrical feed-in of electrical power into the power busbars 6 integrated in the busbar board 1.

Similar to the mounting frame system a feed-in busbar system can be implemented in an alternative embodiment. The feed-in busbars of such a feed-in busbar system can be provided at a distance apart from the mounting plate 16 or being galvanically isolated by means of an insulating plate.

FIG. 19 shows a further view where an electrical device 11 is attached to the front side of the busbar board 1 and is supplied with electrical power via the feed-in power lamella 17 extending between the touch protection base plate 3 and the front surface of the mounting plate 16. As can be seen in FIG. 19, the touch protection base plate 3 can comprise several domes 29 providing a spacing between the rear side of the busbar board 1 and the front side of the mounting plate 16. Connection screws can be used for attaching the busbar board 1 mechanically via the domes 29 to the mounting plate 16. For each integrated power busbar 6 encapsulated by the busbar board 1, a corresponding power supply feed-in laminated copper busbars 17 can be provided. In the example illustrated in FIGS. 18, 19, the system comprises three feed-in laminated copper busbars 17-1, 17-2, 17-3 providing a power supply for a corresponding number of power busbars 6-1, 6-2, 6-3 integrated in the busbar board 1 as also illustrated in FIG. 20.

FIG. 21 shows the attachment of the feed-in laminated copper busbars 17 to the rear side of the busbar board 1 in more detail. The electrical connection of the feed-in laminated copper busbars 17 by means of a clamp or a screw connection as shown in FIG. 22 can be covered by cover hoods 30-1, 30-2, 30-3 as shown in FIG. 21. The different electrical connections of the feed-in laminated copper busbars 17-*i* can in a preferred embodiment also be touch-protected. This can be achieved by means of an electrical isolation layer or an electrical isolating cover. The final section of the feed-in laminated copper busbars 17 can be connected by means of an electrical screw or bolt 31A and by means of mechanical connection nut 31B to a power feed-in plug 10 plugged into a socket 26 of the touch protection base plate 3 as illustrated in more detail also in FIG. 23.

FIGS. 24 to 27 show a feed-in module for all three power busbars 6. It is also possible to provide three separate single-pole feed-in modules.

FIG. 24 shows a further variant of a rear side power feed-in of a busbar board 1 according to the present invention. In the illustrated embodiment of FIG. 24, the busbar board 1 is attached to a mounting plate 16 and receives power via feed-in circular conductors 18. Similar to the feed-in lamellae 17, the feed-in circular conductors 18 can be connected at the rear side of the busbar board 1 by means of power feed-in plugs 10 as shown in FIGS. 26, 27. The circular conductors 18-*i* can be mechanically attached to connectors 32 connected at the rear side via an electrical conduction strip 33 to a power feed-in plug 10 as shown in FIG. 26. The electrical conduction strips 33 can be touch-protected by a cover 34 as also shown in FIG. 25. The components 30, 32, 34 can be formed as a single integrated part. Alternatively, these components are separate parts.

At the rear side of the feed-in module a further set of clamps for round wires can be attached which can be used to connect lines or wires which may provide power supply for another busbar board 1. In this way, an electrical current may be looped through the feed-in module.

Accordingly, one or more busbar boards 1 can be connected to a mounting plate 16 or to a mounting frame 15. The mounting frame 15 or the mounting plate 16 can be integrated in a control cabinet according to a further aspect of the present invention. The control cabinet can be provided for a plurality of different electrical devices 11 connectable to the integrated busbar boards 1 of the control cabinet. These devices 11 can include electric, electronic or electromechanical devices having electrical contacts to establish an electrical connection to the power busbars 6 encapsulated by the busbar boards 1 of the control cabinet. In a preferred embodiment, the busbar boards 1 are mounted to the mounting frame 15 or to the mounting plate 16 such that the elongated housing of the busbar boards 1 extends in horizontal direction. Consequently, the integrated power busbars 6 are also directed in a horizontal direction and can be supplied with power by vertical power supply busbars 19 as shown in FIG. 4 or by power supply laminated copper busbars 17 as shown in FIG. 18 or by circular power conductors 18 as shown in FIG. 24. Besides the touch-protected integrated power busbars 6, further busbars or other electrical conductors can be integrated in the housing of the busbar board 1. Further, mechanical interfaces can be provided to attach further elements on both sides of the busbar board 1. The touch-protected busbar board 1 can also comprise mechanical connection elements used for connecting the busbar board 1 with other similar busbar boards 1 on all four sides of the busbar board 1. The length, width and depth of the busbar board 1 can vary depending on the use case and the electrical requirements of the electrical devices 11 connected to the busbar system.

The touch protection cover plate 2 of the busbar board 1 can provide in a possible embodiment IP20 protection against accidental contact. In further possible embodiments, the touch protection cover plate 2 can also comprise IP30 or IP40 protection) against accidental contact possibly by additional parts or components. This does also apply for the feed-in power busbar system. Polarity reversal protection slots can reliably prevent accidental twisting of the device 11 to be connected to the busbar board 1. The devices 11 can be connected to and disconnected from the busbar system without the use of any tools. If necessary, a slotted screwdriver may be used to operate a latching element such as the latching element 28 to disconnect the busbar board 1 from a mounting plate 16 or from a mounting frame 15.

In a possible embodiment of the busbar board 1, electrical data lines for communication between different devices 11 connected to the power busbars 6 can be integrated in the busbar board 1. In possible embodiments, the devices 11 inserted into the busbar board 1 can comprise a transceiver for exchanging information data by means of powerline communication PLC via the electrically conductive power busbars 6. In a still further alternative embodiment, the devices 11 connected to the busbar board 1 may communicate with each other by means of separate wireless radio interfaces including WLAN, Bluetooth, ZigBee or RFID interfaces. Particular in the case of radio interfaces, the devices 11 may communicate with external transmitters and receivers such as smartphones in order to exchange and set data and parameters.

Further, cooling pipes can be provided within the housing 12 of the busbar board 1 in a possible implementation. The cooling pipes may be provided to transport a dissipating waste heat from the interior of the busbar board 1 and may run vertically after the busbar board 1 has been attached to the mounting frame 15 or mounting plate 16.

Since the power feed-in of electrical power is performed from the rear side of the busbar board 1, the front side of the busbar board 1 can be completely covered by different kinds of electrical devices 11 without wasting any space.

Further variants of the busbar board 1 are possible. For example power feed-in plugs 10 or a power feed-in module can first be plugged onto the external power feed-in system and then be fixed. After this the busbar board 1 is put on the power feed-in plugs 10 or put on the power feed-in module.

REFERENCE LIST

1 elongated busbar board
1-*i* busbar board segment
2 front side touch protection cover plate
2-*i* touch protection cover plate segment
3 touch protection base plate
3-*i* touch protection base plate segment
4 rows of feedthrough openings
5 contact openings
6 power busbars
7 feedthrough openings
8 rows for receiving interlocks
9 row
10 feed-in plugs
11 electrical devices
12 device housing
13A electrical contacts
13B protection rigs
14 contact tongues
15 mounting frame
16 mounting plate
17 feed-in laminated copper busbars
18 feed-in circular conductors
19 feed-in power busbars
20 contact tongues
21 busbar support element
22 vertical struts
23 cross-struts
24 system extension element
25 touch protection
26 sockets
27 interlocks
28 mechanical latching element
29 dome
30 cover hood
31A bolt
31B connection nut
32 connector
33 conduction strip
34 cover
35A clip connection
35B clipping hole
36 expansion joint
37 positioning contour (notch)
38 holding bracket element
39 device latch element

The invention claimed is:

1. A busbar board for connection of one or more devices to a power busbar system, said busbar board comprising a front side touch protection cover plate having feedthrough openings for electrical connection contacts of the one or more devices to be connected to the busbar board, wherein the front side touch protection cover plate is adapted to cover several elongated electrically conductive internal power busbars having contact openings lying directly beneath the feedthrough openings of the front side touch protection cover plate and comprising a touch protection base plate connected to said front side touch protection cover plate, wherein the touch protection base plate covers the internal power busbars enclosed by the busbar board from a rear side of the busbar board, wherein the busbar board further comprises power feed-in plugs, wherein a power feed-in of electrical power into the internal power busbars enclosed by the busbar board is provided by the power feed-in plugs being pluggable into sockets of the touch protection base plate of the busbar board, and wherein the internal power busbars are arranged in parallel and are contactable by the power feed-in plugs from the rear side to provide a rear side power feed-in.

2. The busbar board according to claim 1 wherein the busbar board is attached to a mounting plate or to a mounting frame.

3. The busbar board according to claim 1 wherein the electrical connection contacts are resilient electrical connection contacts, wherein the internal power busbars arranged within the busbar board comprise each a U-shaped cross profile with sidewalls facing each other, and wherein the sidewalls are connected with each other by means of a connecting bridge which comprises the contact openings for insertion of the resilient electrical connection contacts and protection ribs of the one or more devices to be connected to said busbar board from a front side of the busbar board.

4. The busbar board according to claim 3 wherein the power feed-in plugs comprise contact tongues facing each other and which abut one or both sidewalls of a corresponding one of the internal power busbars from an inside or an outside or which are lyra-shaped to embrace a sidewall of the corresponding one of the internal power busbars to provide an electrical contact.

5. The busbar board according to claim 1 wherein the power feed-in plugs which are provided for the power feed-in of electrical power into different ones of the internal power busbars are fixed at the rear side to feed-in laminated busbars or to feed-in circular conductors by means of an associated clamp connection or a screw connection which can be covered by a cover hood.

6. The busbar board according to claim 1 wherein the power feed-in plugs which are provided for the power feed-in of electrical power into different ones of the internal power busbars enclosed by the busbar board are connected at the rear side to feed-in power busbars which are directed crosswise to the internal power busbars enclosed by the busbar board.

7. The busbar board according to claim 6 wherein the power feed-in plugs provided for the power feed-in of electrical power into the different ones of the internal power busbars enclosed by the busbar board comprise each at the rear side lyra-shaped resilient flexible contact tongues which are facing each other and which abut an associated one of the feed-in power busbars to establish an electrical contact.

8. The busbar board according to claim 6 wherein the feed-in power busbars are attached by means of at least one busbar support element to a strut of a mounting frame or to a mounting plate to provide a mechanical support connection and are covered by a cover element and/or comprise an electrical isolation.

9. The busbar board according to claim 8 wherein the feed-in power busbars are oriented in a vertical direction and are attached by means of the at least one busbar support element to a parallel vertical strut of the mounting frame or to a mounting plate for providing a mechanical support connection, wherein the at least one busbar support element is adapted to receive the feed-in power busbars with different cross sections, and wherein the at least one busbar support element comprises corresponding adjustment elements for the different cross sections.

10. The busbar board according to claim 8 wherein the mounting frame comprises at least two parallel struts which are connected to each other by means of one or more cross-struts.

11. The busbar board according to claim 8 wherein the busbar board is attached mechanically to counter-contours of the mounting frame or to counter-contours of the mounting plate by means of bracket elements, angled elements, adapter elements and/or latching elements.

12. The busbar board according to claim 1 wherein the power feed-in plugs which are provided for the power feed-in of electrical power into different ones of the internal power busbars enclosed by the busbar board are integrated in a multipole feed-in plug module.

13. The busbar board according to claim 1 wherein the front side touch protection cover plate of the busbar board can be covered completely with the one or more devices, the one or more devices having the electrical connection contacts passing through the feedthrough openings of the front side touch protection cover plate into the contact openings of a contact opening grid of the internal power busbars to establish an electrical connection.

14. The busbar board according to claim 1 wherein the busbar board consists of several assembled busbar board segments which each comprise a touch protection cover plate segment of the front side touch protection cover plate and a touch protection base plate segment of the touch protection base plate which are connected to each other mechanically.

15. The busbar board according to claim 1 wherein the rear side power feed-in for the internal power busbars by means of the power feed-in plugs is performed by means of load break switches and/or current protection elements located at the rear side of the busbar board and which are operated from a front side of the busbar board or are controlled by means of the one or more devices connected to said busbar board, and wherein the current protection elements comprise controllable electronic current protection elements and/or current protection fuses.

16. The busbar board according to claim 1 wherein the power feed-in plugs, a multipole feed-in plug module integrating the power feed-in plugs and/or the busbar board comprise measuring modules provided for performing a current and/or voltage measurement to generate measurement values output by means of data interfaces.

17. The busbar board according to claim 1 further comprising electrical supply lines or supply busbars for supplying measuring modules provided within the busbar board and/or the one or more devices with auxiliary supply voltages which are applied from the rear side by means of the power feed-in plugs.

18. The busbar board according to claim 1, wherein the busbar board comprises mechanical connection elements used for connecting the busbar board with at least another one of the busbar board.

19. The busbar board according to claim 1 wherein the busbar board is connectable without using a mechanical tool to corresponding counter-contours of a mounting plate or of a mounting frame.

20. The busbar board according to claim 1 wherein the power feed-in plugs plugged into the busbar board are mechanically lockable.

21. The busbar board according to claim 1 wherein the busbar board comprises an elongated shape, and wherein wiring combs or other extension elements are attachable to one or both long sides of the busbar board.

22. A control cabinet with a control cabinet housing which comprises at least one mounting plate and/or at least one mounting frame and comprises at least one or more busbar boards mounted to said mounting plate or mounted to said mounting frame, wherein each of the at least one or more the busbar boards is provided for connection of one or more devices to a power busbar system, said the each of the at least one or more the busbar boards comprising a front side touch protection cover plate having feedthrough openings for electrical connection contacts of the one or more devices to be connected to a respective one of the at least one or more the busbar boards, wherein the front side touch protection cover plate is adapted to cover several elongated electrically conductive power busbars having contact openings lying directly beneath the feedthrough openings of the front side touch protection cover plate and comprising a touch protection base plate connected to said front side touch protection cover plate, wherein the touch protection base plate covers the power busbars enclosed by the respective one of the at least one or more the busbar boards from a rear side of the respective one of the at least one or more busbar boards, wherein the respective one of the at least one or more the busbar boards further comprises power feed-in plugs, wherein a power feed-in of electrical power into the power busbars enclosed by the respective one of the at least one or more the busbar boards is provided by the power feed-in plugs being pluggable into sockets of the touch protection base plate of the respective one of the at least one or more the busbar boards, and wherein the power busbars are arranged in parallel and are contactable by means of the power feed-in plugs from the rear side to provide a rear side power feed-in.

* * * * *